(12) United States Patent
Forbes et al.

(10) Patent No.: US 10,286,767 B2
(45) Date of Patent: May 14, 2019

(54) GLAZING SYSTEM AND SEALING METHODS

(71) Applicant: Engineered Metals & Composites, Inc., West Columbia, SC (US)

(72) Inventors: Edward Forbes, Hilton Head Island, SC (US); Matthew Surratt, Elgin, SC (US)

(73) Assignee: ENGINEERED METALS & COMPOSITES, INC., West Columbia, SC (US)

( * ) Notice: Subject to any disclaimer, the term of this patent is extended or adjusted under 35 U.S.C. 154(b) by 54 days.

(21) Appl. No.: 15/363,113

(22) Filed: Nov. 29, 2016

(65) Prior Publication Data

US 2018/0009300 A1 Jan. 11, 2018

Related U.S. Application Data

(63) Continuation-in-part of application No. 15/205,719, filed on Jul. 8, 2016, now Pat. No. 9,994,288.

(51) Int. Cl.
| | |
|---|---|
| *B60J 1/00* | (2006.01) |
| *B60J 1/02* | (2006.01) |
| *B60J 10/00* | (2016.01) |
| *B63B 19/00* | (2006.01) |
| *B60J 10/70* | (2016.01) |
| *B60J 10/40* | (2016.01) |

(52) U.S. Cl.
CPC ............... *B60J 10/70* (2016.02); *B60J 1/006* (2013.01); *B60J 10/45* (2016.02); *B63B 19/00* (2013.01); *B60J 10/40* (2016.02); *B63B 2019/0046* (2013.01)

(58) Field of Classification Search
CPC ... B60J 10/40; B60J 10/70; B60J 10/45; B60J 1/006; B63B 19/00; B63B 2019/0046
USPC ............................................................ 296/93
See application file for complete search history.

(56) References Cited

U.S. PATENT DOCUMENTS

| | | | |
|---|---|---|---|
| 3,068,617 A | 12/1962 | Borski | |
| 3,978,535 A | 9/1976 | Swan et al. | |
| 4,364,209 A * | 12/1982 | Gebhard | E06B 3/5418 52/204.597 |
| 5,131,194 A | 7/1992 | Anderson | |
| 5,809,707 A | 9/1998 | Bargados et al. | |
| 6,105,320 A | 8/2000 | Boor et al. | |
| 6,158,372 A | 12/2000 | Erskine | |
| 6,643,984 B2 * | 11/2003 | Kato | B60J 1/10 296/146.15 |
| 7,007,628 B1 | 3/2006 | Conley | |
| 7,518,811 B2 | 4/2009 | D'Eon | |
| D606,000 S | 12/2009 | Potts | |
| 7,661,747 B2 | 2/2010 | Erskine | |
| 8,166,725 B2 | 5/2012 | Griffith | |
| 8,221,857 B2 | 7/2012 | Jaeger | |
| 8,312,688 B2 | 11/2012 | Bordeaux et al. | |
| 8,656,594 B2 | 2/2014 | Griffith | |
| 8,808,839 B2 | 8/2014 | Timmermann | |
| 8,833,989 B2 | 9/2014 | Barton et al. | |

(Continued)

*Primary Examiner* — Joseph D. Pape
*Assistant Examiner* — Dana D Ivey
(74) *Attorney, Agent, or Firm* — Thrive IP; Bernard Klosowski

(57) ABSTRACT

Systems and methods including various glazing devices are provided for attaching a window structure to a frame of a vessel or vehicle to form a seal therebetween.

6 Claims, 19 Drawing Sheets

(56) References Cited

U.S. PATENT DOCUMENTS

| | | |
|---|---|---|
| 8,982,441 B2 | 3/2015 | Schlam et al. |
| 9,126,656 B2 | 9/2015 | Griffith |
| 9,259,994 B2 | 2/2016 | Erner |
| 9,447,627 B2 | 9/2016 | Thompson et al. |
| 9,540,863 B2 | 1/2017 | Miller et al. |
| 9,796,249 B2 | 10/2017 | Beaupre et al. |
| 2003/0041537 A1 | 3/2003 | Glover et al. |
| 2004/0261933 A1 | 12/2004 | Buck et al. |
| 2007/0209266 A1 | 9/2007 | Noble et al. |
| 2007/0227430 A1 | 10/2007 | D'Eon |
| 2007/0234943 A1 | 10/2007 | D'Eon |
| 2009/0260758 A1 | 10/2009 | Kosche, Jr. et al. |
| 2010/0058707 A1 | 3/2010 | Griffith |
| 2010/0212828 A1 | 8/2010 | Buck et al. |
| 2012/0180293 A1 | 7/2012 | Griffith |
| 2014/0023802 A1 | 1/2014 | Margalit |
| 2014/0165497 A1 | 6/2014 | Griffith |
| 2015/0101274 A1 | 4/2015 | Rehme |
| 2016/0060945 A1 | 3/2016 | Weiss et al. |
| 2016/0138323 A1 | 5/2016 | Sonderkaer et al. |
| 2017/0122025 A1 | 5/2017 | Badger |

\* cited by examiner

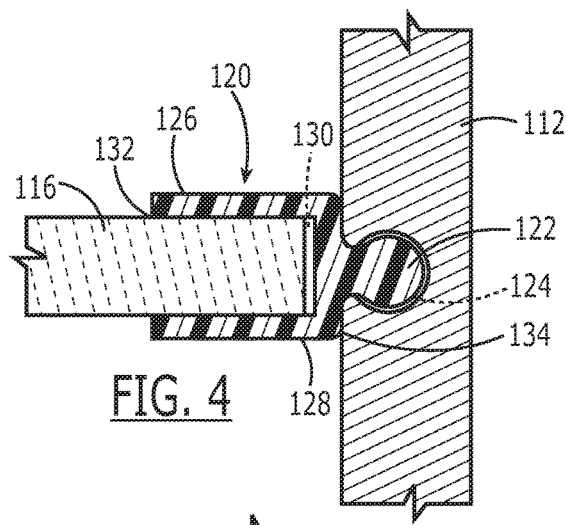
FIG. 4
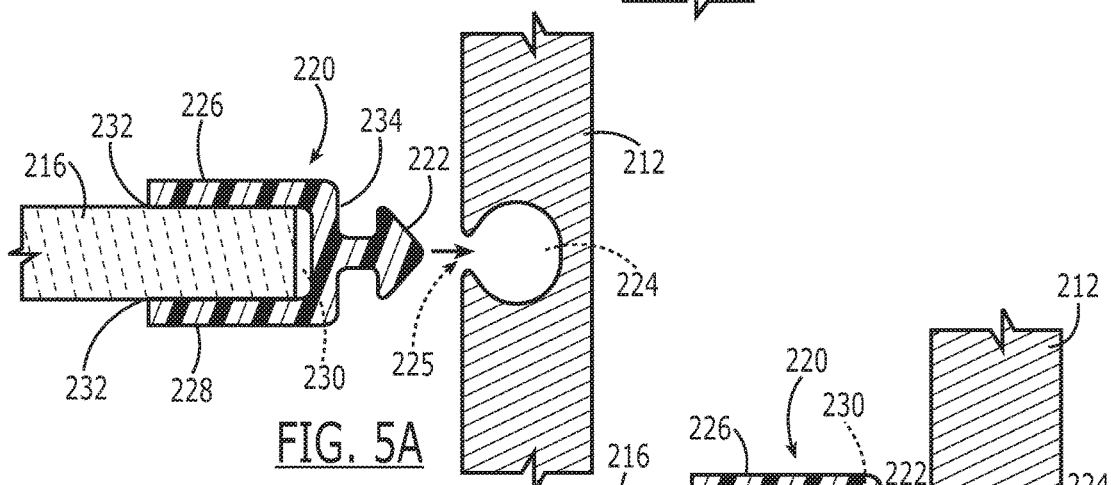
FIG. 5A
FIG. 5B
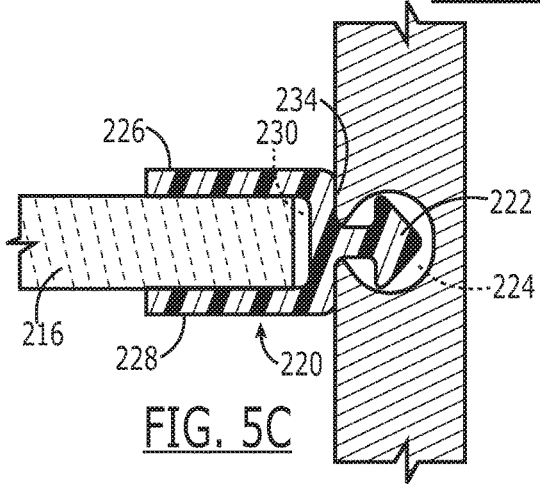
FIG. 5C

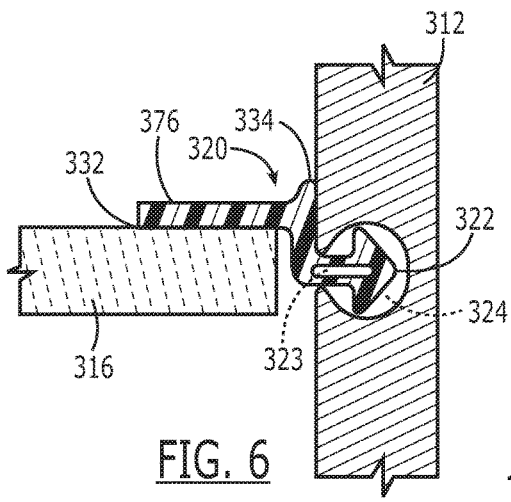
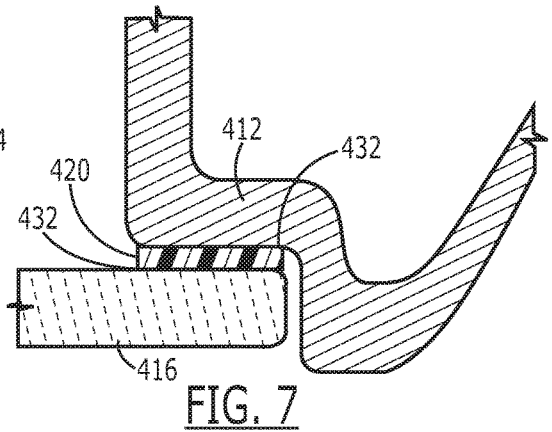
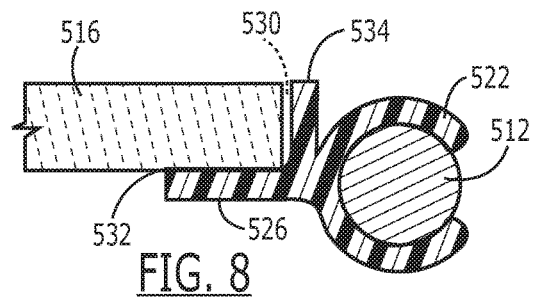
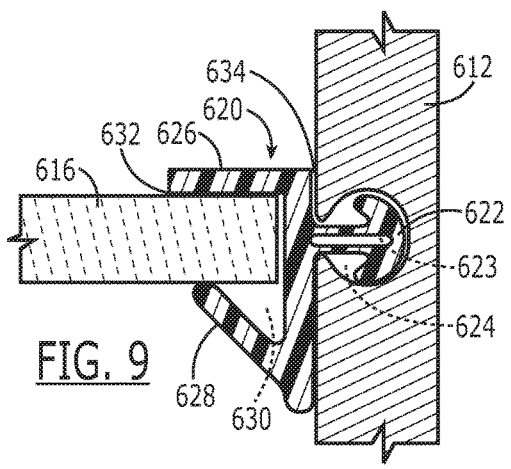
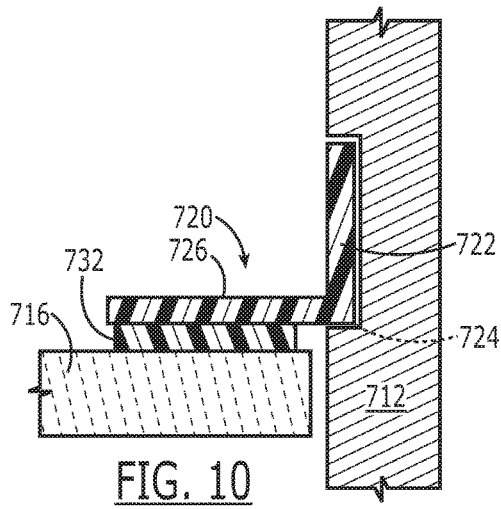

GLAZING SYSTEM AND SEALING METHODS

CROSS-REFERENCE TO RELATED APPLICATIONS

This utility patent application is a continuation-in-part of, and claims priority to, U.S. patent application Ser. No. 15/205,719, filed Jul. 8, 2016, which is incorporated herein in its entirety by reference thereto.

BACKGROUND OF THE DISCLOSURE

Many boats, tractors, construction vehicles and the like utilize windscreens, windshields, or windows to shield operators from rain, water spray, dust, and wind. However, conventional windscreens suffer from a variety of drawbacks. As shown in FIG. 28, for instance, attaching a windscreen 9 to a metal hardtop or tower frame 7 is usually accomplished by drilling holes, or molding apertures or notches, in or near a perimeter of the windscreen 9. The windscreen 9 is typically made of transparent thermoplastic such as Plexiglas® or Lucite® brand materials. The thermoplastic windscreen 9 is then affixed to portions 11 of the hardtop frame 7 using bolts or screws 13 connected through the holes or apertures as shown in FIG. 28. Once the bolts 13 are tightened they eventually weaken the areas of glass 9 near the holes. Over time, the weakened areas of the windscreen 9 crack and "spiderweb" as indicated at element number 15 in FIG. 28. This is not only unsightly, but the spider-webbed glass 15 can be unsafe when the view through the windscreen 9 becomes opaque or obscured. Moreover, the windscreen 9 can even break away from the bolt 13 and frame 7. At the very least, replacing or repairing a cracked windscreen 9 is an expense that most vehicle operators would rather avoid.

Another drawback of conventional window attachments is that a complete, watertight seal is not formed between the windscreen 9 and the frame 7 as shown in FIG. 28. As shown, the bolted windscreen 9 leaves a gap between the glass 9 and frame 7, which permits water, wind or dust to penetrate and spray an operator positioned behind the windscreen 9. Also, the subsequently formed cracks 15 in the windscreen 9 will allow elements to enter a wheelhouse.

What is needed in the industry is a system for attaching windshields to boat superstructures or vehicle frames without weakening the windshields and that will also provide a weatherproof seal between the windshields and frames.

BRIEF SUMMARY OF THE DISCLOSURE

The present disclosure is directed in general to glazing devices for attaching glass or thermoplastic windshields to vehicle and vessel frames. A weatherproof seal is formed between a windshield and the structure to which it is attached using a glazing device.

According to one embodiment of the present disclosure, a glazing system is provided for sealing a marine window to a vessel in which the system may include a first distal end and a second distal end that form a pocket therebetween for receiving a portion of marine glass; a proximal end disposed apart from the pocket; a frame having an aperture therein for receiving the proximal end, the aperture having an entryway, the proximal end being larger than then entryway such that the proximal end is retained in the aperture. At least one of the first distal end and the second distal end is arranged obliquely to the other. The proximal end may be made of an elastomeric material, a thermoplastic material, a metal, an acrylic or a glass material. The proximal end may be C-shaped or arrow-shaped in cross-section, and may include a compression pocket for snap-fitting, compressing, or sliding into the aperture. An adhesive may be inserted into the pocket.

In another embodiment, a system for sealing a marine window to a vessel may include a glazing system having a ledge depending therefrom and a projection extending in a direction opposite the ledge, the ledge and the projection forming a slot therebetween; a window disposed in the slot, a portion of the window engageable against the ledge; and a window frame having a track formed therein, wherein the projection of the glazing system is mated.

The system may include a finger disposed oblique to the ledge such that the finger and the ledge secure the portion of the window in the slot. The projection may be elastomeric material or polyethylene, and may be nipple-shaped, C-shaped, mushroom shaped, or arrow-head shaped. The projection may also a compression pocket, and the projection may be snap-fitted or slid into the track. An adhesive may be added in the slot.

A method for sealing a marine window to a vessel may include providing a glazing system having a ledge depending therefrom and a projection extending in a direction opposite the ledge, the ledge and the projection forming a pocket therebetween for receiving a portion of marine glass; inserting the projection in a track formed in a cabin frame; inserting the portion of marine glass in the pocket; and providing a weatherproof seal between the marine glass and the cabin frame.

A portion of the marine glass according to the exemplary method, may be an edge of the marine glass and the ledge may be substantially equal in height to the edge. The projection may be made of elastomeric material or polyethylene and may be a nipple-shape, a C-shape, or an arrow-head-shape in cross section. The projection may also include a compression space such that the method further includes compressing the space during insertion of the projection in the track. An adhesive may be applied in the pocket.

According to another embodiment, a glazing system for sealing a marine window to a vessel may have a frame with a first aperture therein, and a second aperture formed in the frame apart from the first aperture, the first aperture being configured for receiving a first snap-fit device configured to hold a portion of a glass or a rod, and the second aperture configured for receiving a second snap-fit device, wherein the glass or the rod has a proximal end being complementary in shape to the first aperture, and wherein, when the proximal end is disposed in the first aperture, a seal is formed between the frame and the glass or the rod. The frame may be aluminum, steel, fiberglass, or combinations thereof, and the projection may be a nipple shape, a C-shape, a mushroom shape, or an arrow-head shape.

Additional objects and advantages of the present subject matter are set forth in, or will be apparent to, those of ordinary skill in the art from the description herein. Also, it should be further appreciated that modifications and variations to the specifically illustrated, referenced, and discussed features, processes, and elements hereof may be practiced in various embodiments and uses of the disclosure without departing from the spirit and scope of the subject matter. Variations may include, but are not limited to, substitution of equivalent means, features, or steps for those illustrated, referenced, or discussed, and the functional, operational, or positional reversal of various parts, features, steps, or the like. Those of ordinary skill in the art will better appreciate the features and aspects of the various embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 4 is an a partial, cutaway, plan view of a glazing attachment system according to another aspect of the disclosure for attaching the window as in FIGS. 1 and 2;

FIG. 5A is an a partial, cutaway, plan view of a glazing attachment system according to another aspect of the disclosure for attaching the window as in FIGS. 1 and 2;

FIG. 5B shows the glazing attachment system in FIG. 5A being mated in an exemplary connection process;

FIG. 5C shows the glazing attachment system in FIGS. 5A and 5B mated in an exemplary connection process;

FIG. 6 is a partial, cutaway, plan view of a glazing attachment system according to another aspect of the disclosure for attaching the window as in FIGS. 1 and 2;

FIG. 7 is a partial, cutaway, plan view of a glazing attachment system according to another aspect of the disclosure for attaching the window as in FIGS. 1 and 2;

FIG. 8 is a partial, cutaway, plan view of a glazing attachment system according to another aspect of the disclosure for attaching the window as in FIGS. 1 and 2;

FIG. 9 is a partial, cutaway, plan view of a glazing attachment system according to another aspect of the disclosure for attaching the window as in FIGS. 1 and 2;

FIG. 10 is a partial, cutaway, plan view of a glazing attachment system according to another aspect of the disclosure for attaching a window as in FIGS. 1 and 2;

DETAILED DESCRIPTION OF THE DISCLOSURE

Figure 1:
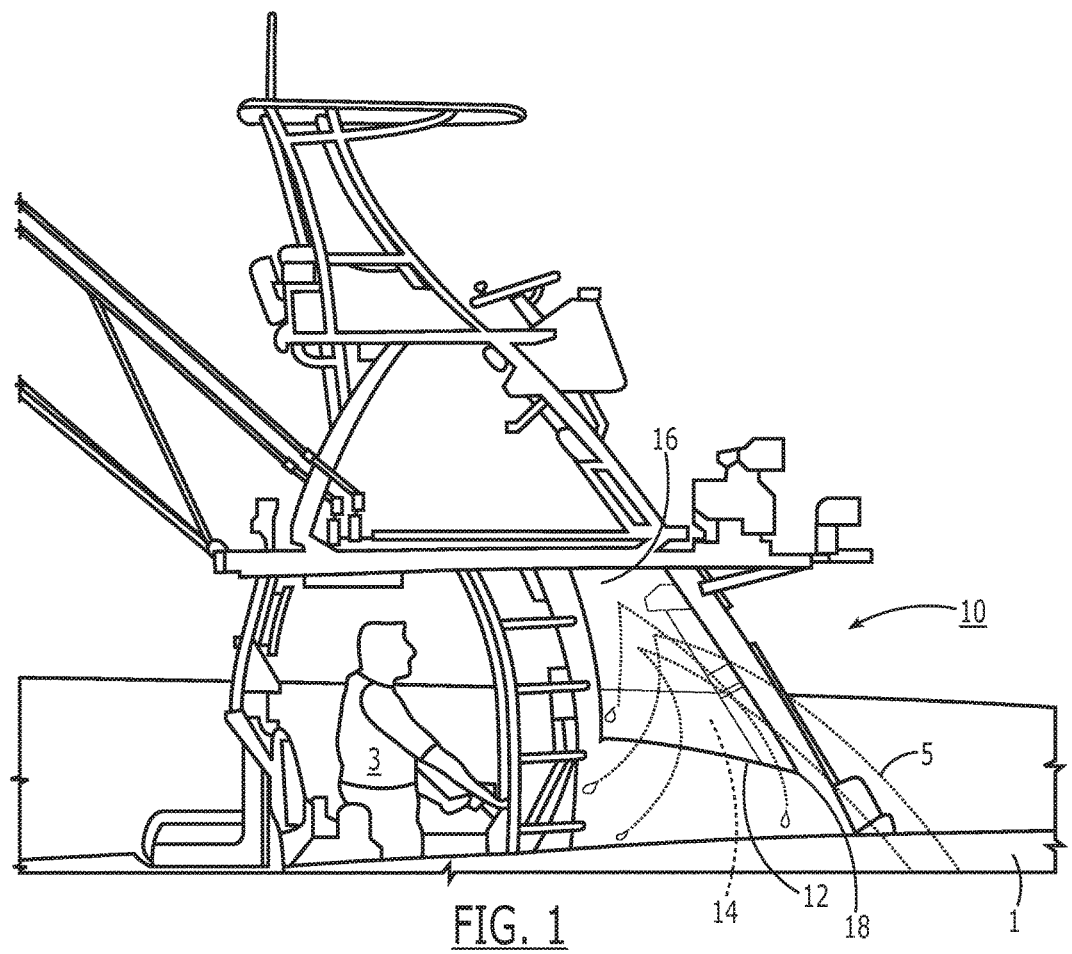
FIG. 1 is a partial elevational view of a window in an intended environment according to an aspect of the disclosure.

Detailed reference will now be made to the drawings in which examples embodying the present subject matter are shown. The detailed description uses numerical and letter designations to refer to features of the drawings.

The drawings and detailed description provide a full and written description of the present subject matter, and of the manner and process of making and using various exemplary embodiments, so as to enable one skilled in the pertinent art to make and use them, as well as the best mode of carrying out the exemplary embodiments. However, the examples set forth in the drawings and detailed descriptions are provided by way of explanation only and are not meant as limitations of the disclosure. The present subject matter thus includes any modifications and variations of the following examples as come within the scope of the appended claims and their equivalents.

Although detailed embodiments are disclosed as required, it is to be understood that the embodiments are merely exemplary. The figures are not necessarily to scale, and some features may be exaggerated to show details of particular components. Therefore, specific structural and functional details disclosed herein are not to be interpreted as limiting, but merely as a basis for the claims and as a representative basis for teaching one skilled in the art to variously employ the various embodiments of the present disclosure.

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

Wherever the phrase "for example," "such as," "including" and the like are used herein, the phrase "and without limitation" is understood to follow unless explicitly stated otherwise. Similarly "an example," "exemplary" and the like are understood to be non-limiting.

The term "substantially" allows for deviations from the descriptor that do not negatively impact the intended purpose. Descriptive terms are understood to be modified by the term "substantially" even if the word "substantially" is not explicitly recited.

The term "about" when used in connection with a numerical value refers to the actual given value, and to the approximation to such given value that would reasonably be inferred by one of ordinary skill in the art, including approximations due to the experimental and or measurement conditions for such given value.

The terms "comprising" and "including" and "having" and "involving" (and similarly "comprises", "includes," "has," and "involves") and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etcetera. Thus, for example, "a device having components a, b, and c" means that the device includes at least components a, b and c. Similarly, the phrase: "a method involving steps a, b, and c" means that the method includes at least steps a, b, and c.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Any discussion of prior art in the specification should in no way be considered as an admission that such prior art is widely known or forms part of common general knowledge in the field.

The various embodiments of the disclosure and/or equivalents falling within the scope of present disclosure overcome or ameliorate at least one of the disadvantages of the prior art, or provide a useful alternative.

Turning now to the figures, FIG. 1 shows a maritime vessel or boat designated in general by reference numeral 1. Here, a cockpit, hardtop, conning tower, or wheelhouse window system 10 shields an operator 3 from sea spray, wind or rain, shown schematically and designated by element number 5. The window system 10 may broadly include a frame or housing 12, which may be made of stainless steel, aluminum or other metals, or other materials such as high density polyethylene (HDPE) or treated wood. As shown, the frame 12 may include an aperture or window opening 14 having a glass or Plexiglas®-type window 16 sealed along a perimeter 18 of the opening 14.

Figure 2:
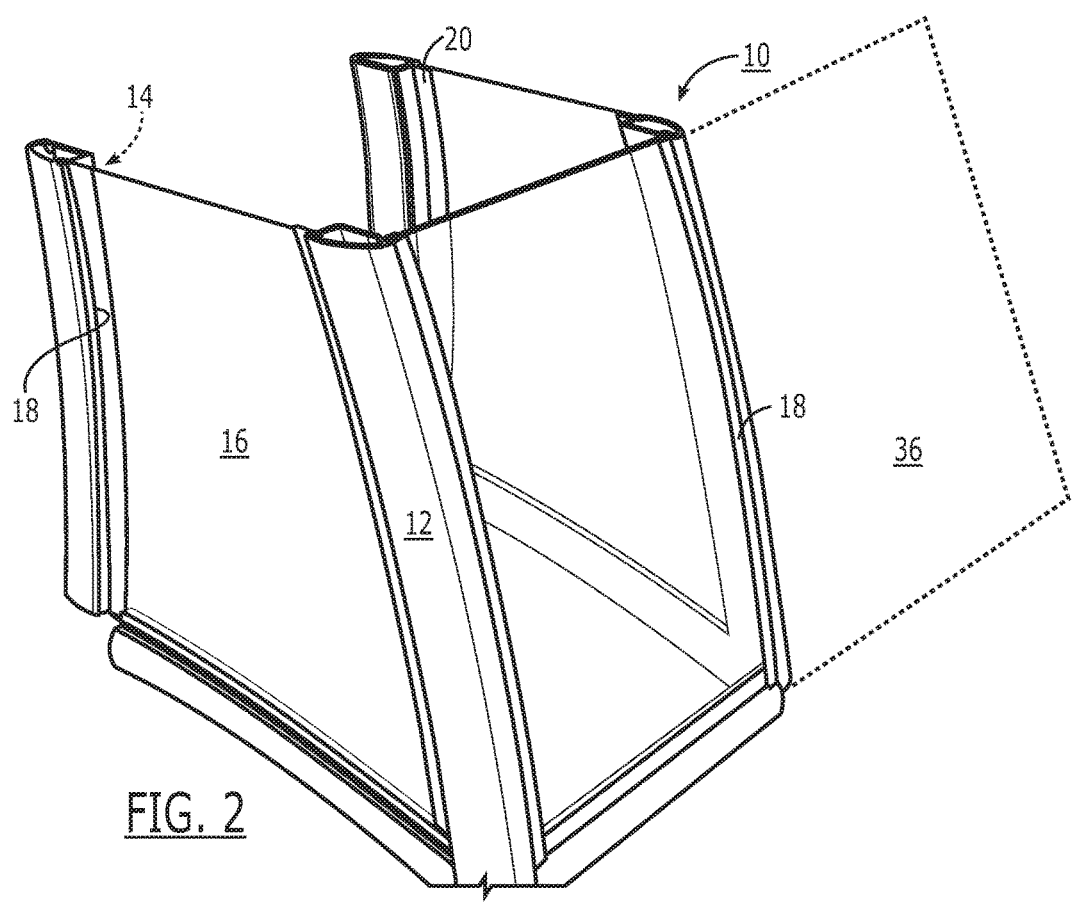
FIG. 2 is a partial perspective view of the window as in FIG. 1 and also showing in phantom a window attachment according to another aspect of the disclosure.

FIG. 2 most clearly shows the window system 10 as in FIG. 1. Here, the partially cut-away frame 12 is shown mated with the window 16, which is inserted in the opening 14. More particularly, the window 16 is attached to the frame 12 using a glazing system 20, which seals the window 16 along a perimeter 18, the systems and methods of which are described in greater detail below. Also shown in phantom for clarity is a "gull-wing" extension device or shield 36 that can be snap-fitted along the perimeter 18 to provide additional protection from wind and water (compare FIG. 11A).

Figure 3:
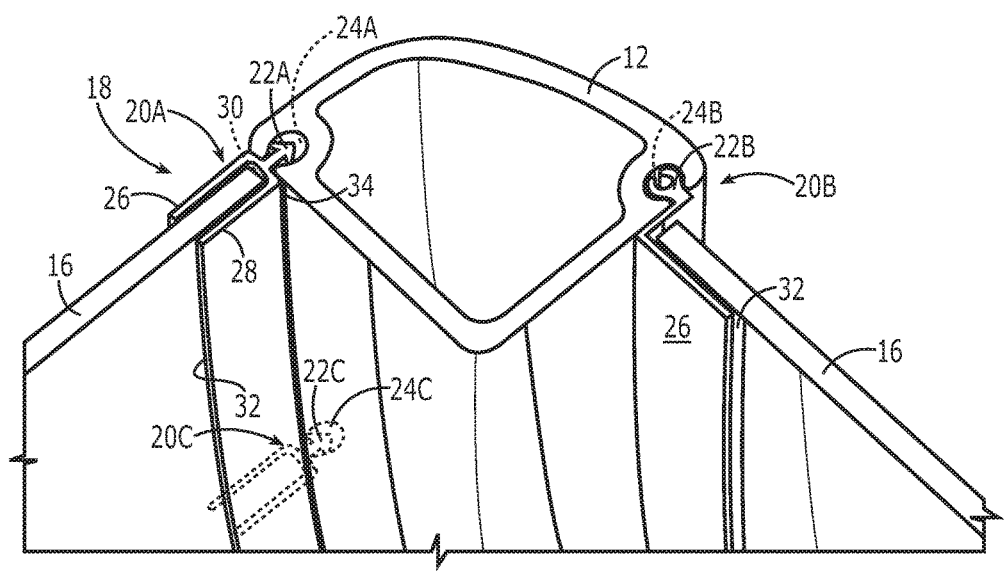
FIG. 3 is a partial, cutaway, perspective view of a glazing attachment system according to an additional aspect of the disclosure for attaching the window as in FIGS. 1 and 2.

In FIG. 3, a portion of the window system 10 from FIG. 2 is shown partially cut-away for clarity. In practice only one embodiment would likely be employed in most applications; however, for convenient comparison this example shows three possible glazing systems 20A, 20B, 20C according to the disclosure for forming a watertight seal 18 between the window 16 and the frame 12. As shown, the glazing system 20A mates the window 16 to the frame 12 to form a watertight seal 18. More particularly, the frame 12 may include an opening, aperture, sail track or race way 24A in which a projection or proximal end 22A of the glazing system 20A is snap-fitted or anchored, as described by example operation below. The proximal end 22A may be a nipple shape, a C-shape, a mushroom shape, or an arrow-head shape and is preferably an elastomeric material such neoprene but could be natural rubber, or a thermoplastic material such as polyethylene; a thermoplastic elastomer; or aluminum, acrylic, glass, metal and the like. The glazing system 20A may also include a first distal end, ledge, or finger 26 and a second distal end or finger 28 that form a pocket, cavity or slot 30. The first and second fingers 26, 28 may be attached to or pressed against a portion of the window 16 as shown in FIG. 3. For example, the window 16 may be slid downward into the slot 30 prior to placing a top or cover (not shown) over the window system 10. Additionally or alternatively, an adhesive 32, such as but not limited to Loctite®-brand Marine Epoxy, 3M™ Marine Adhesive Sealant, or 3M™ VHB™ tape, may be provided in the slot 30 to further anchor and seal the window 16 within the slot 30. An abutment or shoulder 34 also may be formed between the first and second fingers 26, 28 and the proximal end 22A. Here, the shoulder 34 presses against a portion of the frame 12 to hold the window 16 in place.

FIG. 3 further shows an alternative glazing system 20B for mating another window 16 to the frame 12 to form the watertight seal 18. Again, the frame 12 may include a track or receptacle 24B in which a proximal end 22B is snap-fitted or anchored. The exemplary glazing system 20B may also include a distal end, ledge or finger 26 to receive a portion of the window 16. For example, the window 16 can be pressed against the ledge 26 and held in place using an adhesive 32.

Still further, the glazing system 20C shown in phantom in FIG. 3 may be utilized to form the watertight seal 18 between the window 16 and the frame 12. In this variation, instead of a glazing system like systems 20A or 20B that run substantially an entire length of the window 16, the glazing system 20B may be separate, multiple snap-fits 20C having respective proximal ends 22C that anchor into respective receptacles 24C formed intermittently along the frame 12. Those skilled in the art will recognize that the referenced distal ends and proximal ends of these exemplary embodiments may be reversed. For instance, although not a preferred embodiment, the window 16 could be formed with a race way in a window edge or perimeter into which a proximal end of a snap-fit glazing device, extending from the frame 12, could be attached.

Now with regard to FIG. 4, according to another embodiment of the disclosure a glazing system 120 mates a window 116 to a cabin frame 112 to form a watertight or weatherproof seal. As shown, the frame 112 may include an opening, aperture, sail track or race way 124 in which a projection or proximal end 122 of the glazing system 120 is snap-fitted or slidingly connected and anchored. The proximal end 122 is a substantially round, nipple shape in this example, but could be a C-shape, a mushroom shape, or an arrow-head shape in cross-section, and is preferably a salt-water resistant thermoplastic or an elastomeric material but could be made of other materials. Here, the glazing system 120 may also include a first distal end or finger 126 and a second distal end or finger 128 that form a pocket, cavity or slot 130. The first and second fingers 126, 128 may be attached to or pressed against a portion of the window 116. For example, the window 116 can be slid into and along the slot 130 prior to placing a top or cover (not shown) over the window 116. Additionally or alternatively, an adhesive 132, such as but not limited to Loctite®-brand Marine Epoxy, 3M™ Marine Adhesive Sealant, or 3M™ VHB™ tape, may be provided in the slot 130 to further anchor and seal the window 116 within the slot 130 and/or between the window 116 and fingers 126, 128. A shoulder 134 also may be formed between the first and second fingers 126, 128 and the proximal end 122 where, as here, the shoulder 134 presses against a portion of the frame 112 to hold the window 116 stationary.

With reference to FIGS. 5A, 5B, and 5C, another embodiment of the disclosure shows a glazing system 220 being used in an exemplary operation to mate a window 216 to a cabin frame 212 to form a watertight seal. As shown in FIG. 5A, the frame 212 may include an opening, aperture, sail track or race way 224 in which an arrowhead-shaped, proximal end 222 of the glazing system 220 is snap-fitted or slidingly connected and anchored. The glazing system 220 may also include a first distal end, wall, ledge, or finger 226 and a second distal end, wall, ledge, or finger 228 that form a pocket, cavity or slot 230. As shown here, the first and second walls 226, 228 may be attached to, pressed, or squeeze-fitted against a portion of the window 216. For example, the window 216 may be slid into and along the slot 230 prior to placing a top or cover (not shown) over the window 216. Additionally or alternatively, an adhesive 232, such as but not limited to Loctite®-brand Marine Epoxy, 3M™ Marine Adhesive Sealant, or 3M™ VHB™ tape, may be provided in the slot 230 to further anchor and seal the window 216 within the slot 230. Also shown, a shoulder 234 may be formed between the first and second walls 226, 228 and the proximal end 222 to stabilize the window 216 against the frame 212 when the proximal end 222 is pushed into opening 224 as shown by the right facing arrow, described below.

FIG. 5B shows that the combined window 216 and glazing system 220 can be pressed into the aperture 224 of the frame 212. As shown, the proximal end 222, which in this example may be an elastomeric material such as rubber or flexible polyethylene and shaped like an arrowhead, will be compressed inwardly by a chokepoint 225 in order to pass through and into the raceway 224. Of course, the glazing system 220 could first be mated with the frame 21, and the window 216 attached and/or the adhesive sealant 232 subsequently could be added. Still further, instead of press-fitting from a side, the proximal tip 222 of the glazing system 220 may be slid down (or upward as the case may be) and along the aperture 224 of the frame 212.

FIG. 5C shows that once the proximal tip 222 of the glazing system 220 is in the track 224, a spring constant of the elastomeric material of the tip 222 causes it to return to its original shape. Accordingly, in this example, barbs 222A/B of the arrowhead-shaped, proximal tip 222 will resist being pulled backward through the relatively smaller chokepoint 225. Further, the shoulder 234 will press against a portion of the frame 212 on either side of the chokepoint 225 to hold the window 216 in place; e.g., to prevent lateral movement.

Turning now to FIG. 6, an additional embodiment according to the disclosure shows a glazing system 320 for attaching a window 316 to a cabin frame 312 to form a watertight seal. As shown, the frame 312 may include an opening, aperture, sail track or raceway 324 in which a proximal end 322 of the glazing system 320 is snap-fitted or slidingly connected and anchored. Here, the glazing system 320 may include a distal end, wall, ledge, or finger 326. The wall 326 may be attached to or pressed against a portion of the window 316, and a waterproof adhesive 332, such as but not limited to Loctite®-brand Marine Epoxy, 3M™ Marine Adhesive Sealant, or 3M™ VHB™ tape, may be provided to seal the window 316 against the ledge 326. Furthermore, a reinforcing shoulder 334 may be formed between the ledge 326 and the proximal end 322. In this example, the shoulder 334 is located opposite of the window 316 to counteract a force of the glass 316 pressing against the ledge 326.

FIG. 6 also shows that the proximal end 322, which in this example can be an elastomeric material such as rubber or flexible polyethylene and shaped like an arrowhead, may include a compression/expansion pocket 323 that will assist the proximal end 322 to compress into the raceway 324. For instance, the pocket 323 may compress in on itself, but once the proximal end 322 is seated in the raceway 324, the pocket 323 and proximal end 322 will return to their original forms to help anchor the glazing system 320 in the frame 312.

FIG. 7 shows another embodiment of the disclosure in which a glazing system 420 is used to seal a window 416 to a cabin frame 412 to form a weatherproof seal. Here, the frame 412 is complementarily formed to receive the glazing system 420, which may be attached using a waterproof adhesive 432, such as but not limited to Loctite®-brand Marine Epoxy, 3M™ Marine Adhesive Sealant, or 3M™ VHB™ tape, to anchor and seal the window 416 against the frame 412.

With reference to FIG. 8, another embodiment of the disclosure shows a glazing system 520 for attaching a window 516 to a portion of a wheelhouse frame 512 to form a weatherproof seal. As shown, the frame portion 512 may be a tubular component about which a proximal end 522 of the glazing system 520 is snap-fitted or slidingly connected and anchored. Here, the glazing system 520 may include a distal end, wall, ledge, or finger 526. The wall 526 may be attached to or pressed against a portion of the window 516. A glass adhesive 532, such as but not limited to Loctite®-brand Marine Epoxy, 3M™ Marine Adhesive Sealant, or 3M™ VHB™ tape, may be provided to seal the window 516 against the ledge 526. Also, a shoulder 534 may be formed between the ledge 526 and the proximal end 522 to form a pocket 530 in which the window is held.

Turning to FIG. 9, yet another embodiment of the disclosure shows a glazing system 620 being used in an exemplary operation to mate a window 616 to a cabin frame 612 to form a watertight seal. As shown, the frame 612 may include an opening, aperture, sail track or race way 624 in which a proximal end 622 of the glazing system 620 is snap-fitted or slidingly connected and anchored. Here, the glazing system 620 may include a first distal end, wall, ledge, or finger 626 and a second distal end, wall, ledge, or finger 628 that form a pocket, cavity or slot 630. The first and second walls 626, 628 may be attached to or pressed against a portion of the window 616. For example, the window 616 may be slid into and along the slot 630 prior to placing a top or cover (not shown) over the window 616. Additionally or alternatively, a marine adhesive 632, such as but not limited to Loctite®-brand Marine Epoxy, 3M™ Marine Adhesive Sealant, or 3M™ VHB™ tape, may be provided in the slot 630 to further anchor and seal the window 616 within the slot 630. Also, as shown in this example a shoulder 634 may be formed between the first and second walls 626, 628 and the proximal end 622 to prevent the assembly 620 from moving sideways relative to the frame 612. Still further, the exemplary second wall 628 may be angled to provide an additional clamping structure to fix the window 616 in place.

FIG. 9 also shows that the proximal end 622, which in this example can be an elastomeric material such as rubber or flexible polyethylene and shaped like a mushroom anchor, may include a compression/expansion pocket 623 that will assist in compressing the proximal end 622 into the raceway 624. Once the proximal end 622 is seated in the raceway 624, the pocket 623 and proximal end 622 will return to their original forms and anchor the glazing system 620 in the frame 612.

FIG. 10 shows another embodiment of the disclosure in which a glazing system 720 is used to seal a window 716 to a boat-top 712 to form a weatherproof seal. Here, a portion of the frame 712 is formed with a complementary-shaped opening, aperture, or indentation 724 to receive a proximal end 722 of the glazing system 720. A distal end, wall, ledge, or finger 726 of the glazing system 720 may be attached using an adhesive 732, such as but not limited to Loctite®-brand Marine Epoxy, 3M™ Marine Adhesive Sealant, or 3M™ VHB™ tape, to anchor and seal the window 716.

Figure 11A:
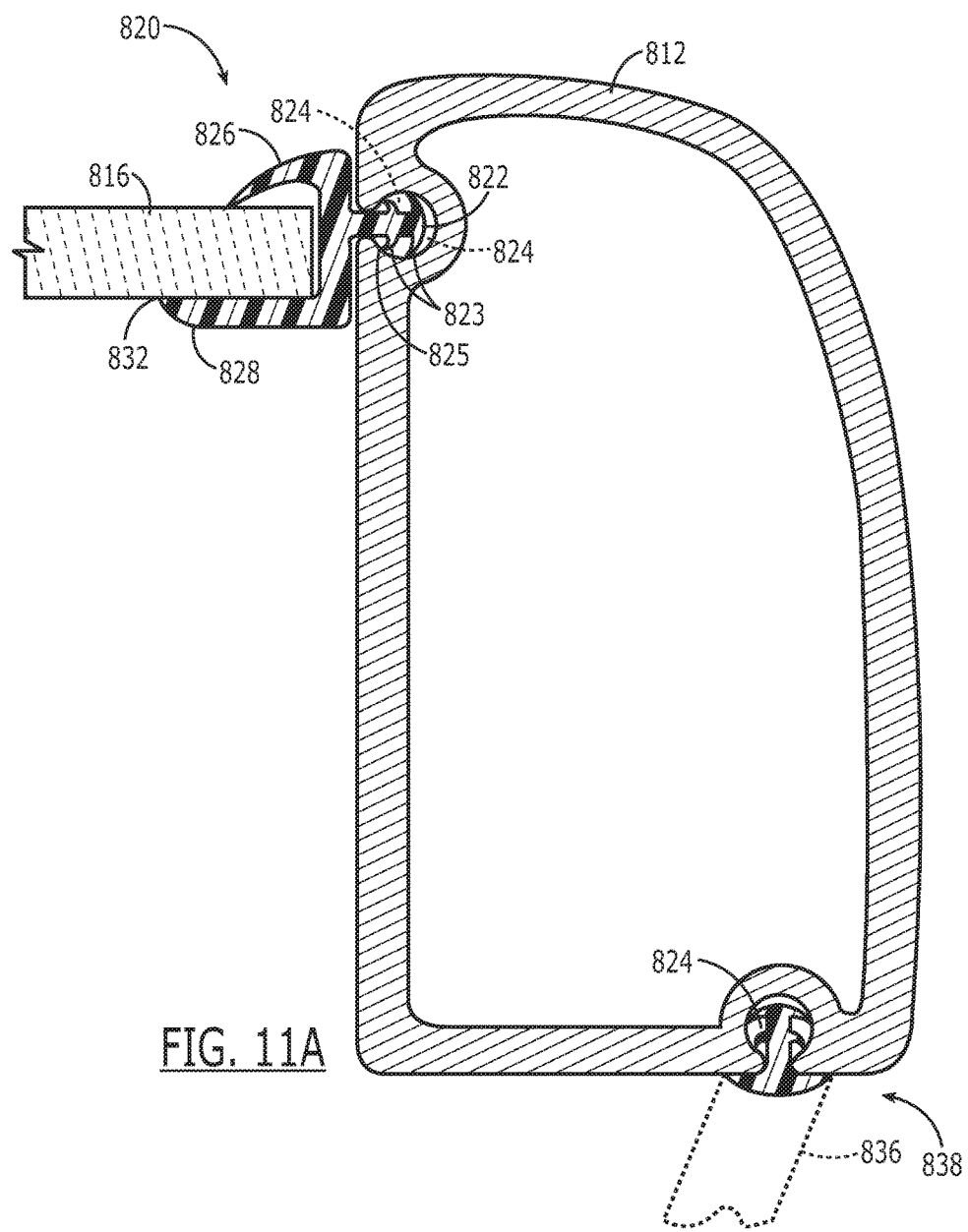
FIG. 11A is a partial, cutaway, plan view of a glazing attachment system according to another aspect of the disclosure for attaching a window as in FIGS. 1 and 2, including a portion of the window attachment shown in phantom as in FIG. 1.
Figure 11B:
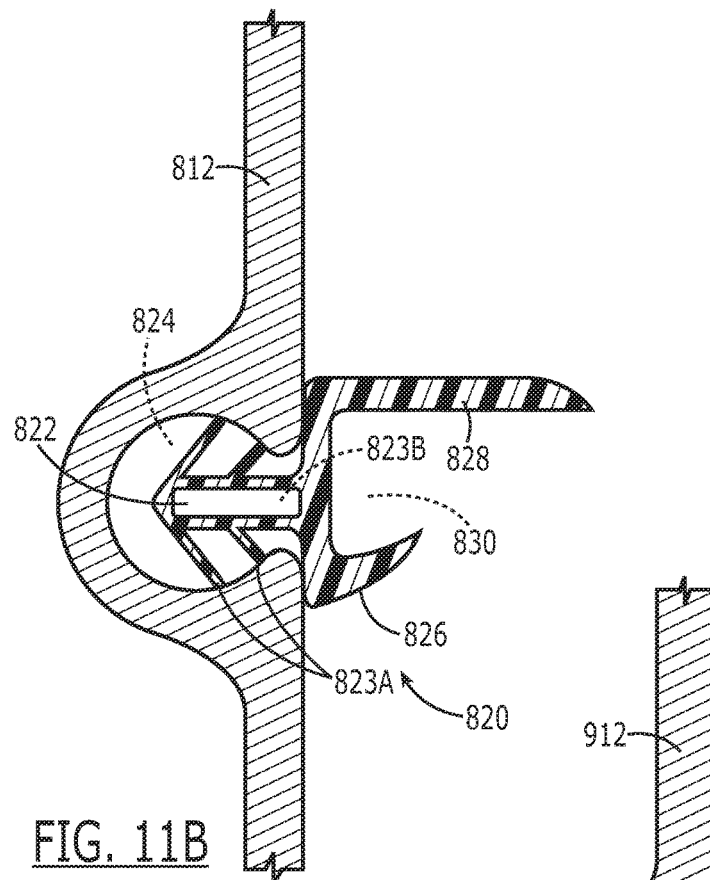
FIG. 11B is a partial, cutaway, plan view of the glazing attachment system as in FIG. 11A.

With reference now to FIGS. 11A and 11B, another embodiment of the disclosure shows a glazing system 820 for forming a weathertight seal 818 between a window 816 and a frame 812. As shown in FIG. 11A, for instance, the frame 812 may include an opening, aperture, sail track or race way 824 in which an exemplary rubber or thermoplastic proximal end 822 of the glazing system 820 is snap-fitted or slidingly connected, and anchored. The glazing system 820 may also include a first distal end, wall, or finger 826 and a second distal end, wall, or finger 828 that form a pocket, cavity or slot 830. The first and second fingers 826, 828 may be attached to or pressed against a portion of the window 816. In this example, the window 816 may be slid into the slot 830 before placing a cover (not shown) over the window 816. Additionally or alternatively, a marine-resistant adhesive 832 may be provided in the slot 830 to further anchor and seal the window 816 within the slot 830.

FIG. 11A further shows that the proximal end 822, which may be shaped like a double-headed arrow with multiple barbs 823, will assist, once the proximal end 822 is seated in the raceway 824, in anchoring the glazing system 820 to the frame 812. Also shown in this example, is a cover or shield 836 (compare gullwing 36 in FIG. 1) using a snap-fit device 838. Here, the device 838 is attached to the shield 836 and is inserted in a slot or aperture 824 in the frame 812. The exemplary device 838 may be an elastomeric material such as rubber or flexible polyethylene and may be double-mushroom-shaped in cross section, but the device 838 also can be made of other weatherproof materials and may have different shapes. The device 838 also may be used independently to seal or cover the slot 824 if the gullwing 836 is not in use, for instance, for aesthetics.

FIG. 11B shows that the double-headed arrow-shaped proximal end 822 of FIG. 11A in more detail. Here, the multiple barbs 823A may be arranged around a compression/expansion pocket 823B that will assist in compressing the proximal end 822 into the raceway 824. As noted above, once the proximal end 822 is press-fit into the raceway 824, the pocket 823B and the surrounding barbs 823A of the elastomeric proximal end 622 will urge themselves to return to their original form to help anchor the glazing system 820 in the frame 812.

Figure 12:
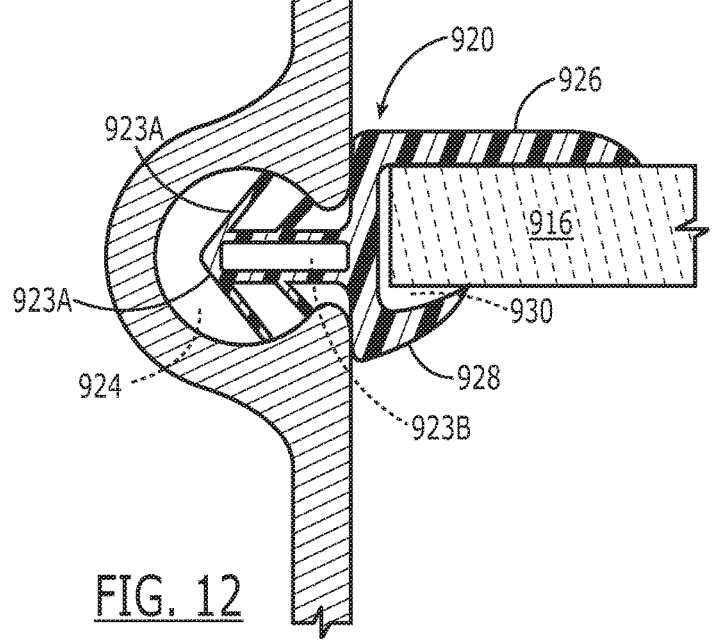
FIG. 12 is a partial, cutaway, plan view of a glazing attachment system according to another aspect of the disclosure for attaching the window as in FIGS. 1 and 2.

FIG. 12 shows another arrowhead-shaped embodiment of a glazing system 920 in which a proximal end 922 may have barbs or anchors 923A and a compression/expansion pocket 923B that will assist in compressing the proximal end 922 into a raceway 924 of a frame 912. Once the proximal end 922 is press-fit or slid into the raceway 924, the barbs 923A and the pocket 923B of the elastomeric proximal end 922 will return to their original form to help anchor the glazing system 920 within the frame 912. Also as shown this example, the glazing system 920 may include a first distal end, wall, ledge, or finger 926 and a second distal end, wall, ledge, or finger 928 that form a pocket, cavity or slot 930. The first and second walls 926, 928 may be attached to or pressed against a portion of the window 916. For example, the window 916 can be slid into and along the slot 930 prior to placing a top or cover (not shown) over the window 916. Moreover, the exemplary second wall 928 may be curved or angled to provide an additional holding or clamping structure to fix the window 916 and prevent its movement.

Figure 13:
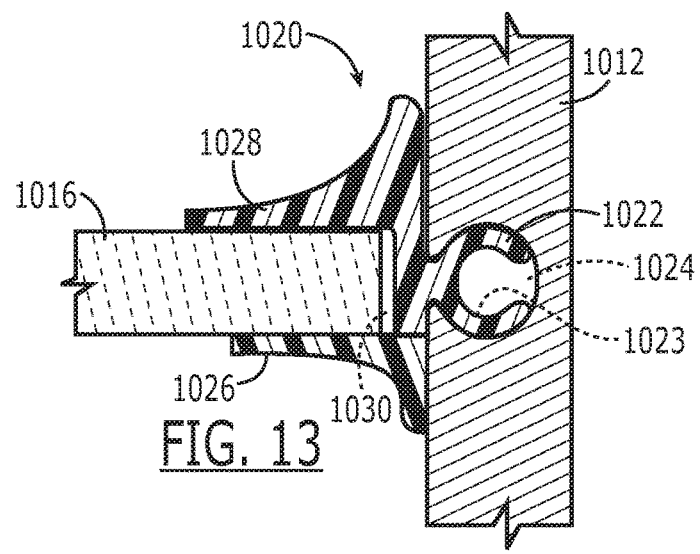
FIG. 13 is a partial, cutaway, plan view of a glazing attachment system according to another aspect of the disclosure for attaching the window as in FIGS. 1 and 2.

Turning to FIG. 13, a further embodiment of the disclosure shows a glazing system 1020 for forming a weathertight seal between a window 1016 and a vessel structure 1012. As shown, the frame 1012 may include an opening, aperture, sail track or race way 1024 in which a proximal end 1022 of the glazing system 1020 is snap-fitted or slidingly connected, and anchored. In this example, the window 1016 may slide into a pocket, cavity or slot 1030 before placing a cover (not shown) over an edge of the window 1016. As shown, the glazing system 1020 may include a first distal end, wall, or finger 1026 and a second distal end, wall, or finger 1028 that form the slot 1030. Here, the first and second fingers 1026, 1028 may be attached to or pressed against a portion of the window 1016, and the fingers 1026, 1028 may increase in thickness near the frame 1012 to help buttress and anchor the window 1016.

FIG. 13 also shows that the proximal end 1022, which in this example can be an elastomeric material such as rubber or flexible polyethylene and may be shaped like a C in cross section, may include a compression/expansion pocket 1023 that will assist in compressing the proximal end 1022 into the raceway 1024. Once the proximal end 1022 is seated in the raceway 1024, the pocket 1023 and proximal end 1022 will return to their original form to help anchor the glazing system 1020 in the frame 1012.

Figure 14:
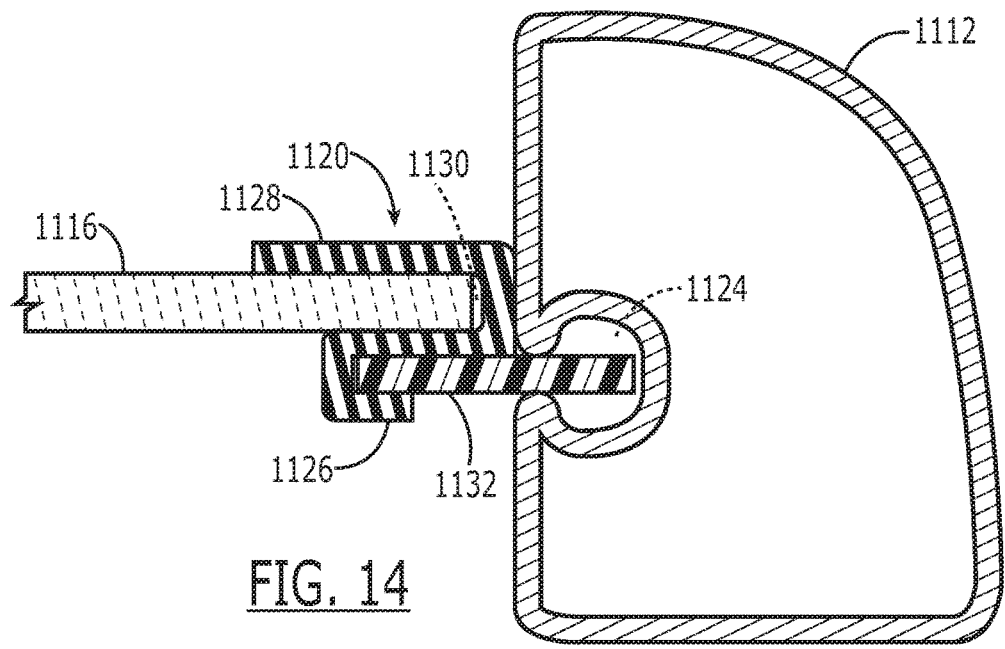
FIG. 14 is a partial, cutaway, plan view of a glazing attachment system according to another aspect of the disclosure for attaching the window as in FIGS. 1 and 2.

FIG. 14 shows another embodiment of the disclosure in which a glazing system 1120 for forming a weathertight seal between a window 1116 and a frame 1112 may include an opening, aperture, sail track or race way 1124 in the frame 1112. The glazing system 1120 may also include a first distal end, wall, or finger 1126 and a second distal end, wall, or finger 1128 that form a pocket, cavity or slot 1130. Here, the window 1116 can be slid down into the slot 1130 prior to placing a top or cover (not shown) over the window 1116. The first and second fingers 1126, 1128 can be formed as one serpentine-shaped unit as shown in this example, and can be attached to or pressed against an adhesive-coated component 1132 that extends into the race way 1124 to help anchor the window 1116.

Figure 15:
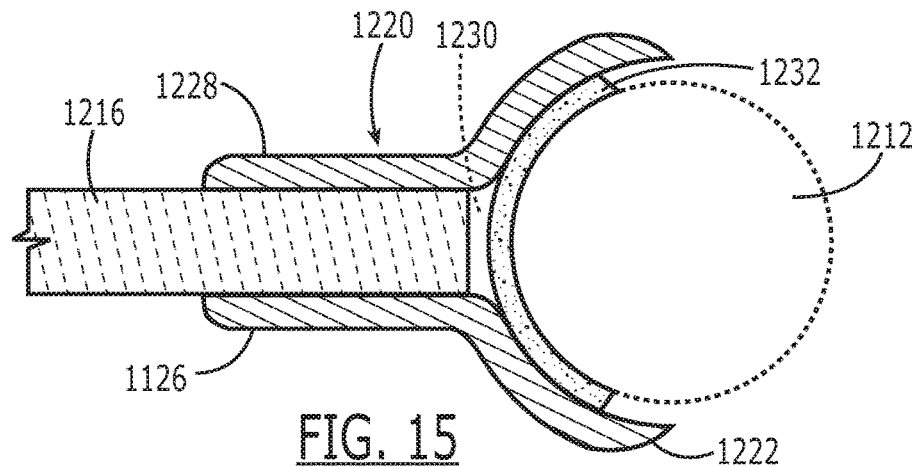
FIG. 15 is a partial, cutaway, plan view of a glazing attachment system according to another aspect of the disclosure for attaching the window as in FIGS. 1 and 2.

FIG. 15 shows an additional embodiment of the disclosure in which a glazing system 1220 for forming a weathertight seal between a window 1216 and a portion of a frame 1212. The glazing system 1220 may include a first distal end, wall, or finger 1226 and a second distal end, wall, or finger 1228 that form a pocket, cavity or slot 1230. Here, the window 1216 can be slid into the slot 1230 prior to placing a top or cover (not shown) over the window 1216. As shown, the first and second fingers 1226, 1228 can be attached to or pressed against an adhesive-coated component 1232 that is wrapped about and/or glued to the frame 1212 to help anchor the window 1116.

Figure 16:
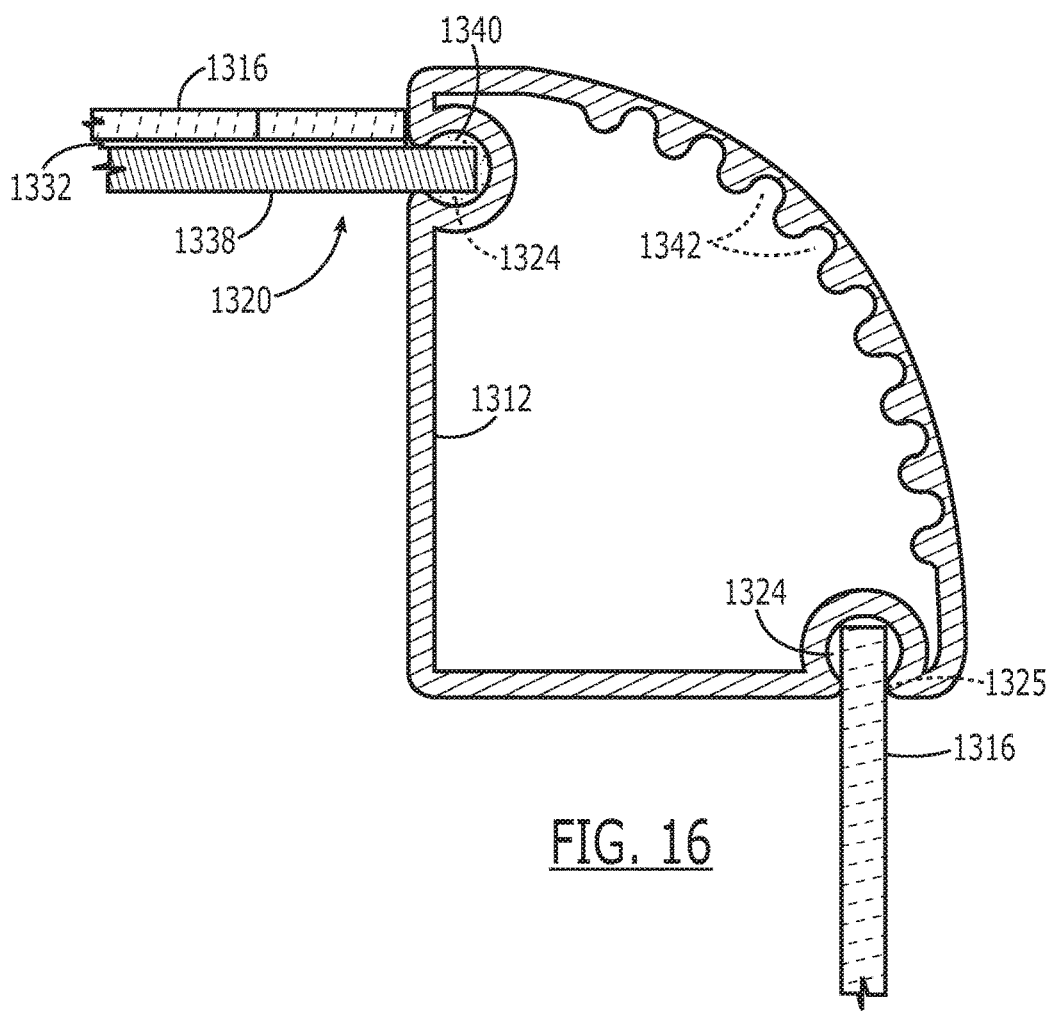
FIG. 16 is partial, cutaway, plan view of an attachment system for attaching the window as in FIGS. 1 and 2.

With reference now to FIG. 16, another embodiment according to the disclosure is shown in which a glazing system 1320 forms a weathertight seal between a wheelhouse frame 1312 and a window 1316. Here, the frame 1312, which may be lightweight stainless steel or aluminum, may include a series of arches 1342 having a scallop-shaped cross section to provide additional structural integrity and strength to the frame 1312. The frame 1312 may also include one or more raceways 1324 having respective chokepoints 1325 for holding respective ends of brackets or braces 1338 therein. Alternatively, the window 1316 can be inserted directly in the raceway 1324 through the chokepoint 1325. As shown, the chokepoints 1325 anchor the window 1316 or the brace 1338 to which the window 1316 is attached to prevent movement of the window 1316 relative to the frame 1312. Here, an adhesive 1332, such as glue or tape, may be used to bond or secure the window 1316 to the brace 1338. Also shown, a sealant 1340, such as adhesive, silicone caulk, or epoxy resin, may be used within the raceway 1324 to provide additional securement.

Figure 17:
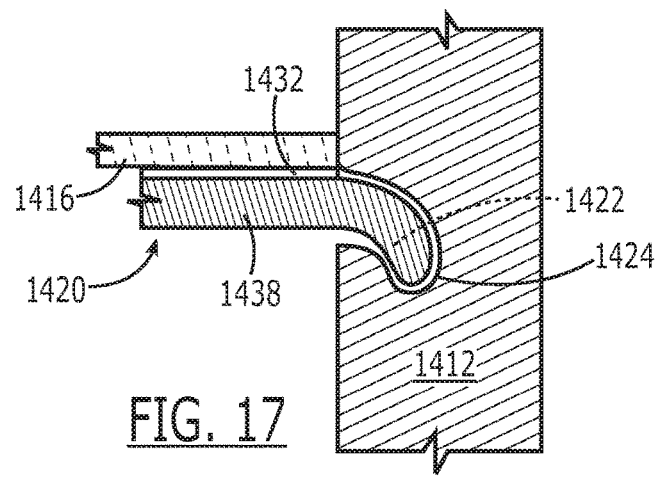
FIG. 17 is partial, cutaway, plan view of an attachment system for attaching the window as in FIGS. 1 and 2.

FIG. 17 shows an additional embodiment of the disclosure having a glazing system 1420 for forming a weather-tight seal between a window 1416 and a frame 1412. The frame 1412 may include a curved opening, aperture, sail track or race way 1424. As shown, the glazing system 1420 may include bar or rod 1438 having a curved finger or protrusion 1422 that fits into the curved sail track 1424. Here, the finger 1422, which may be metal, may be "wrapped," angled, or slid into the curved sail track 1424, and the window 1416 may be attached or pressed against an adhesive-coated component 1432 to secure the window 1416 to the bar 1438, either before or after snapping the finger 1422 into the sail track 1424. The curvature of the finger 1422 and the complementary sail track 1424 prevent movement of the installed components and help secure and seal the window 1416 against the frame 1412.

Figure 18:
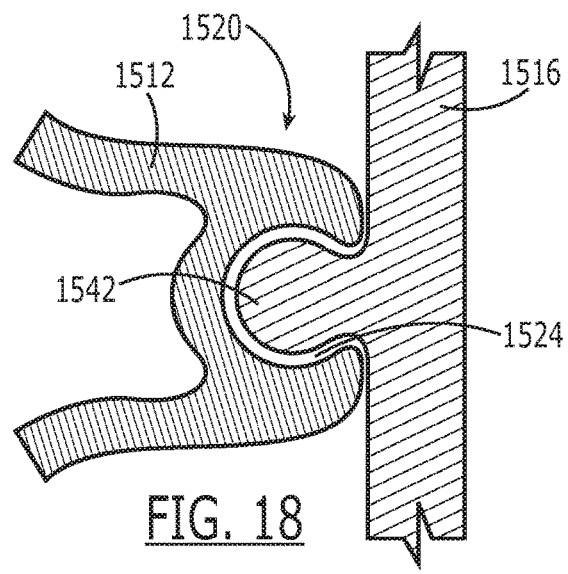
FIG. 18 is partial, cutaway, plan view of an attachment system for attaching the window as in FIGS. 1 and 2.

With reference to FIG. 18, another aspect of the disclosure is shown in which a glazing system 1520 is provided for forming a weathertight seal between a window 1516 and a frame 1512. The frame 1512 may include a C-shaped opening, aperture, sail track or race way 1524. The window 1516 may have a bulbous or nipple-shaped projection 1542 that may be slid into the sail track 1524. As shown, the complementary curvatures of the projection 1542 and the race 1524 will prevent movement of the components and help secure and seal the window 1516 against the frame 1512.

Figure 19:
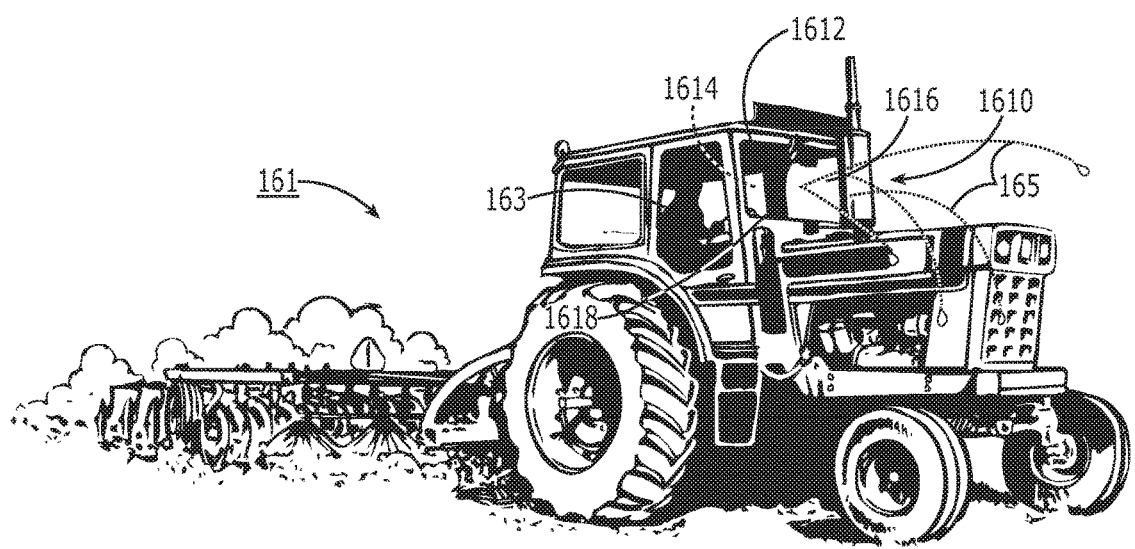
FIG. 19 is a perspective view of a window attachment system shown in an intended environment according to another aspect of the disclosure.

Turning now to FIG. 19, a tractor and its tillage or other equipment are designated broadly by reference number 161. The tractor 161 includes a driver's compartment, cab or cabin window system 1610 to shield an operator 163 from dust, wind, fertilizer particulates, irrigation spray, rain or the like, which is shown schematically and designated by element number 165. The window system 1610 broadly includes a frame or housing 1612, which may be constructed from stainless steel, aluminum or other metals, or other durable materials such as high density polyethylene (HDPE). As shown, the frame 1612 includes an aperture or window opening 1614 having a glass or Plexiglas®-type window 1616 sealed along a perimeter 1618 of the opening 1614.

Figure 20:
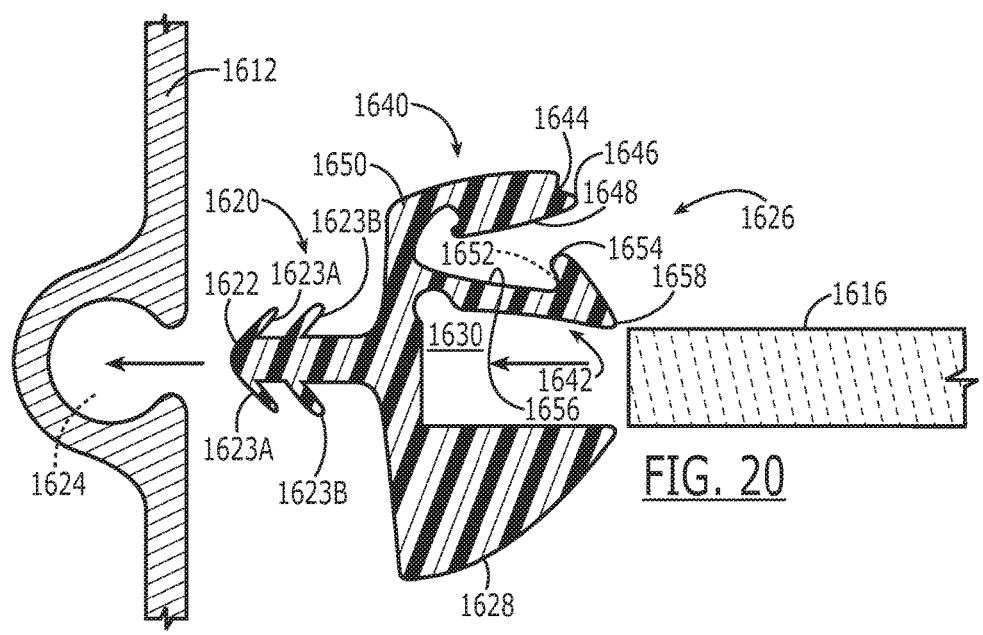
FIG. 20 is an end view in cross section of a connection system for attaching a window as in FIG. 19.

FIG. 20 shows a glazing system 1620 for mating a window structure such as a portion of the frame 1612 in FIG. 19 to the cab and/or to mate or attach the window 1616 to the frame 1612 to form a watertight or weatherproof seal. In this example, a portion of the frame 1612 may include an opening, aperture, recess, sail track or race way 1624 in which a projection, finger edge, or proximal end 1622 of the glazing system 1620 is snap-fitted or slidingly connected and anchored. Also in this example, the proximal end 1622 may have elastically deformable barbs or anchors 1623A and 1623B such as rubber or flexible polyethylene that can temporarily compress during insertion in the raceway 1624.

In some embodiments, the barbs 1623A,B may have a lower elastic modulus than other portions of the glazing system 1620. Once the proximal end 1622 is press-fitted or slid into the raceway 1624, the elastomeric barbs 1623A,B will return to their original form within the raceway 1624 to help secure the glazing system 1620 to the frame 1612.

As FIG. 20 further shows, the glazing system 1620 includes a locking mechanism 1626 and a support wall, base, ledge, or runner 1628 that form a pocket, cavity or slot 1630. Here, the locking system 1626 includes a subservient, outer flap or wing 1640 and a master or interior flap or wing 1642. The outer flap 1640 may include an indentation or groove 1644, a projection, lip, catch or attachment member 1646 located at a distal end of the flap 1640, and a face or surface 1648 extending from a proximal end near a joint or shoulder 1650. Also shown, the complementary interior flap or first distal member 1642 may include an indentation or groove 1652 located at a distal end of the flap 1642, another projection, catch, or attachment member 1654, another face or surface 1656, and a gripping, mating, or point-bearing surface 1658 extending from a proximal end of the flap 1642 at the joint 1650. The disclosure, however, is not limited this exemplary arrangement. For instance, the order and position of the wings 1640, 1642 could be reversed or the catches 1646, 1654 on the wings 1640, 1642 could be reversed. Moreover, the glazing system 1620 can be used on a variety of vessels and vehicles and is not restricted to the tractor 161 shown in FIG. 19. The glazing system 1620 and its components are described in additional detail by way of example operation below with respect to FIGS. 24A, 24B, and 24C.

Figure 21:
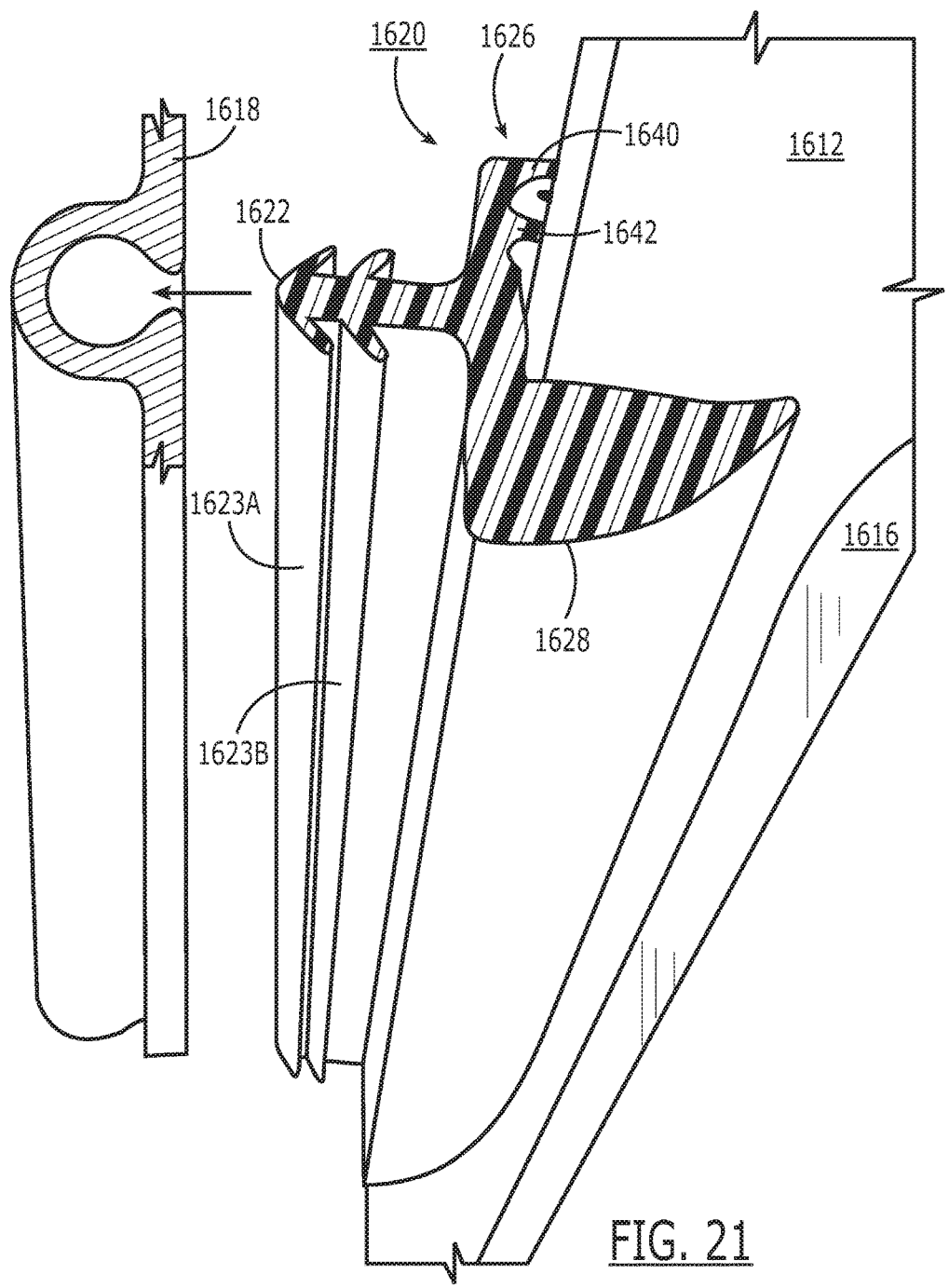
FIG. 21 is a bottom perspective view of the connection system as in FIG. 20.

FIG. 21 most clearly shows the proximal end 1622 of the glazing system 1620 as introduced in FIG. 20. This example differs from FIG. 20 in that the base 1628 and the interior flap 1642 of the mechanism 1626 are mated against a portion of the window frame 1612 holding the window 1616, in contrast to the proximal end 1622 being inserted in the window frame 1612 as in FIG. 20. For context, a portion of the upper flap 1640 can also be seen above the flap 1642. Thus, in FIG. 21 the proximal end 1622 is inserted in a portion of the cab perimeter 1618.

Figure 22:
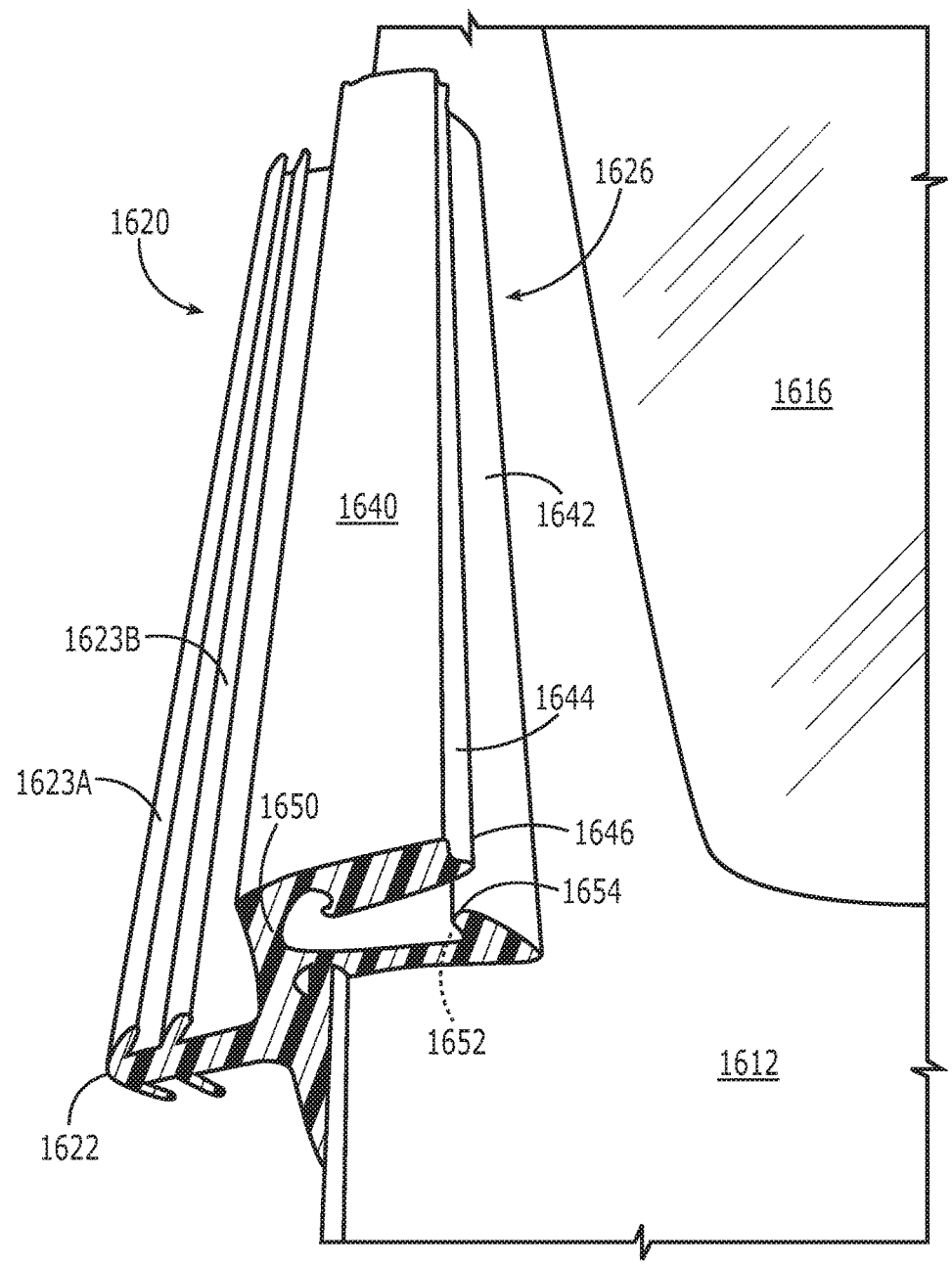
FIG. 22 is top perspective view of the connection system as in FIG. 20, particularly showing an open state.

With reference now to FIG. 22 the locking system 1626 is most clearly shown, which, as introduced above, includes the master flap 1642 that holds the subservient flap 1640 when the flaps 1640, 1642 are locked or snapped together. Here, the groove 1644 and the catch 1646 of the outer flap 1640 can be seen in perspective relative to the complementary groove 1652 and catch 1654 of the interior flap 1642. As discussed in greater detail below, when the groove 1644 and the catch 1654 and the catch 1646 and the groove 1652 are respectively connected by articulating or bending the flap 1640 at joint 1650, the frame 1612 and window 1616 are secured in the glazing system 1620 for further attachment via the proximal end 1622 and its exemplary barbs 1623A,B.

Figure 23:
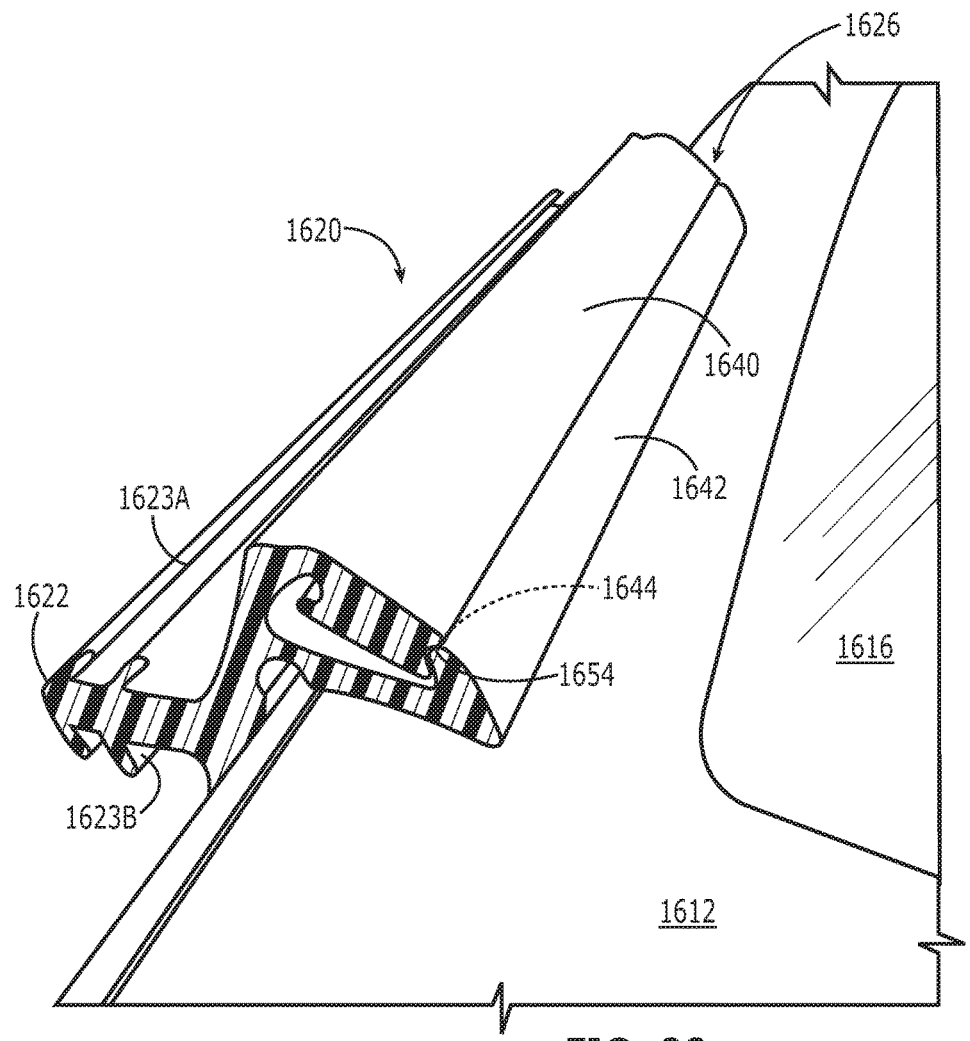
FIG. 23 is a perspective view of the connection system as in FIG. 20, particularly showing a closed state.

FIG. 23 is another view of the glazing system 1620 as in FIG. 22. Here, the flaps 1640, 1642 of the locking system 1626 are closed together to form a seamless grip on the frame 1612 and window 1616, and the glazing system 1620 is ready for further connection via the proximal end 1622 and its exemplary barbs 1623A,B.

Figure 24A:
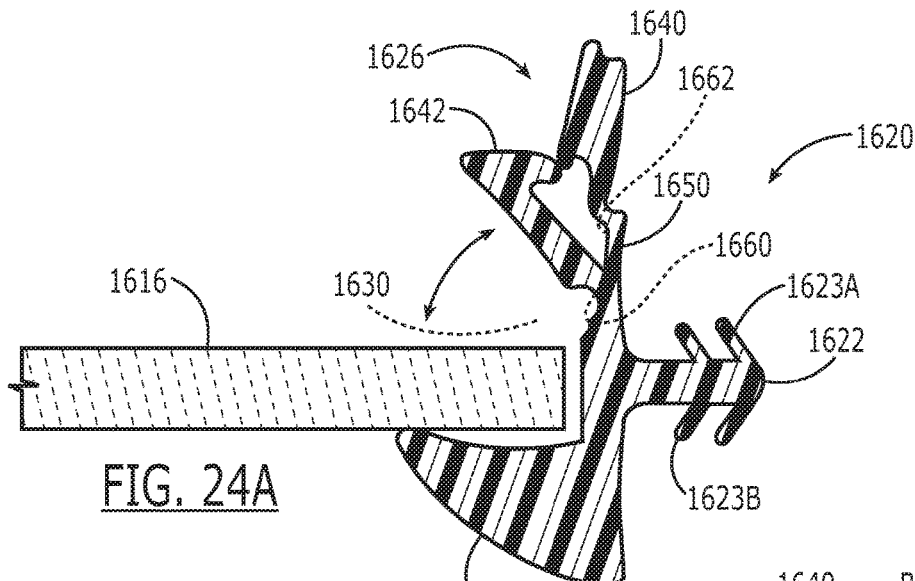
FIGS. 24A, 24B, and 24C are cross-sectional, end views of the connection system as in FIG. 20 showing an installation procedure according to an aspect of the disclosure.
Figure 24B:
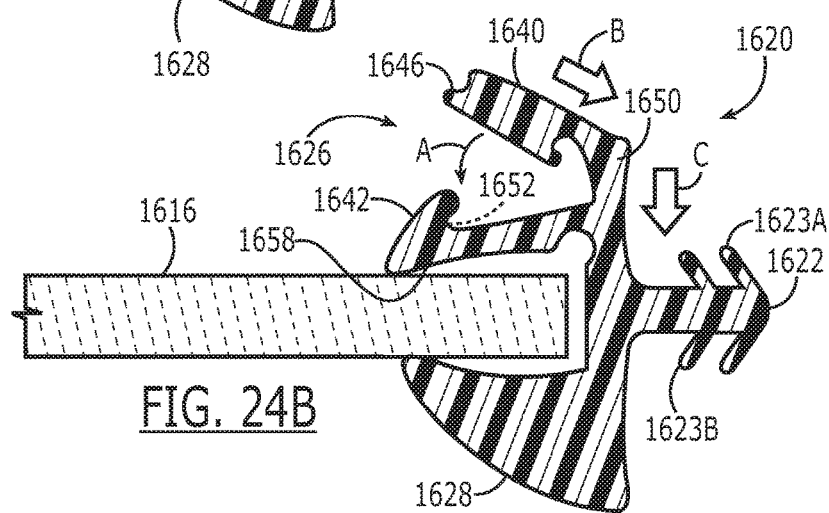
Figure 24C:
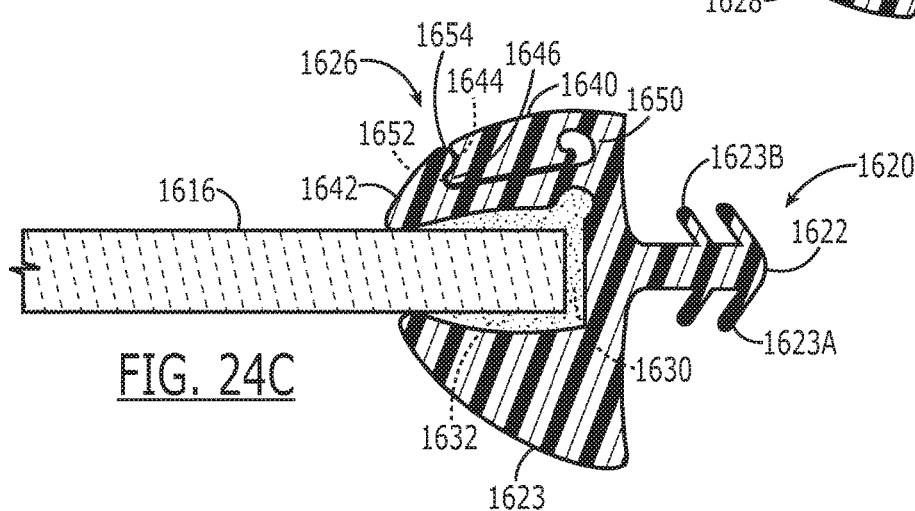

FIGS. 24A, 24B, and 24C show an application of the glazing system 1620. By way of example operation, in FIG. 24A the locking mechanism 1626 is open or retracted away from the base 1628 in a first relaxed state or condition to expand the pocket 1630 to receive a window frame or, as here, a portion of the window glass 1616, which may be glass, Plexiglas®-type material, or other transparent windshield material. More particularly, the exterior flap 1640 and the interior flap 1642 are articulated at joint 1650 as indicated by the double-headed arrow, first in a direction of the proximal end 1622 and its barbs 1623A,B. A gap or indentation 1660 may be provided to enable the joint 1650 to bend easier. Likewise, another indentation 1662 may be formed within or near the flap 1640 for additional flexibility. With the locking mechanism 1626 in the first open state, the glass 1616 is positioned within the pocket 1630. Next, a transient state is shown in FIG. 24B in which the flaps 1640, 1642 are bent again at the joint 1650 in a direction of the glass 1616 as indicated by the curved arrow A. Here, part or all of the mating surface 1658 of the flap 1642 contacts a portion of the glass 1616. As the flap 1640 is push-pressed toward the flap 1642 as indicated by arrow B, the joint 1650 begins to compress as indicated by arrow C. Finally, FIG. 24C shows the flaps 1640, 1642 mated, hooked, or coupled together with the second catch or attachment member 1646 seated in the notch 1652 and the first catch or attachment member 1654 seated in notch 1644. In this closed, second state of tension, the locking mechanism 1626 appears substantially seamless and, under compression, seals and holds the glass 1616 and prevents its movement from the pocket 1630. Additionally, an adhesive 1632, such as but not limited to Loctite®-brand Marine Epoxy, 3M™ Marine Adhesive Sealant, or 3M™ VHB™ tape, may be utilized in the slot 1630 to further anchor and seal the window 1616 within the slot 1630.

Figure 25:
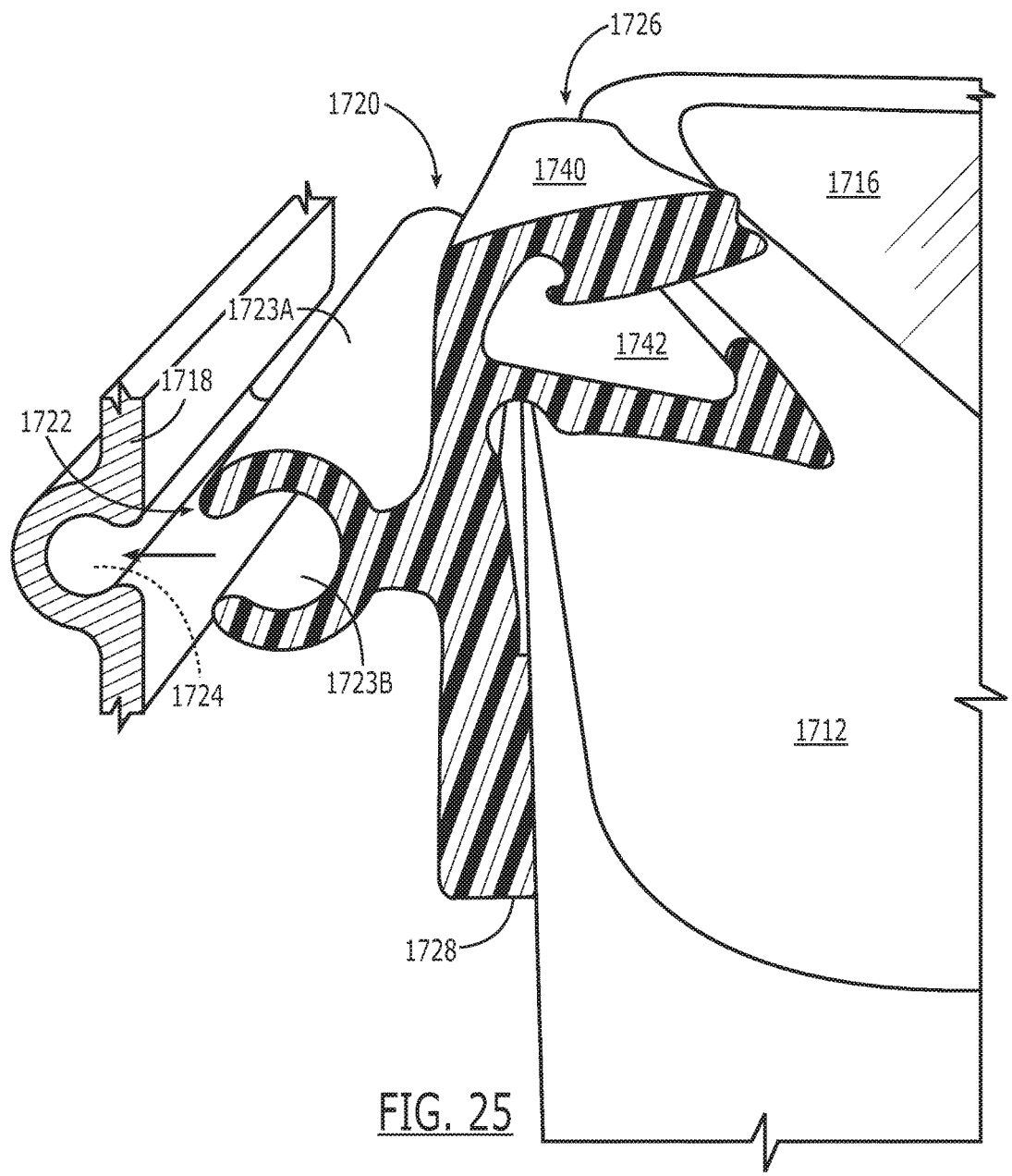
FIG. 25 is a perspective end view of a connection system according to another aspect of the disclosure, particularly showing an unlocked state.

Turning to FIG. 25, a glazing system 1720 is shown in a partially open, transient state for mating a portion of a frame 1712 and/or a window 1716 to an opening in an operator's cab 1718 to form a watertight or weatherproof seal. In this example, the window 1716 is sealed in the frame 1712, which in turn is positioned within the glazing system 1720. Here, a projection or proximal end 1722 of the glazing system 1720 is snap-fitted or slidingly connected and anchored within an opening, aperture, sail track or race way 1724 of the cab housing 1718. In this example, the proximal end 1722 has elastically deformable fingers or anchors 1723A and 1723B such as rubber or flexible polyethylene that can temporarily compress during insertion in the raceway 1724. Once the proximal end 1722 is press-fitted or slid into the raceway 1724, the fingers 1723A,B will return to their original form within the raceway 1724 to help secure the glazing system 1720 to the frame 1718. Also shown, the glazing system 1720 includes a locking mechanism 1726 having a first wing 1740 and a second wing 1742 in a partially open or retracted state from a base 1728.

Figure 26:
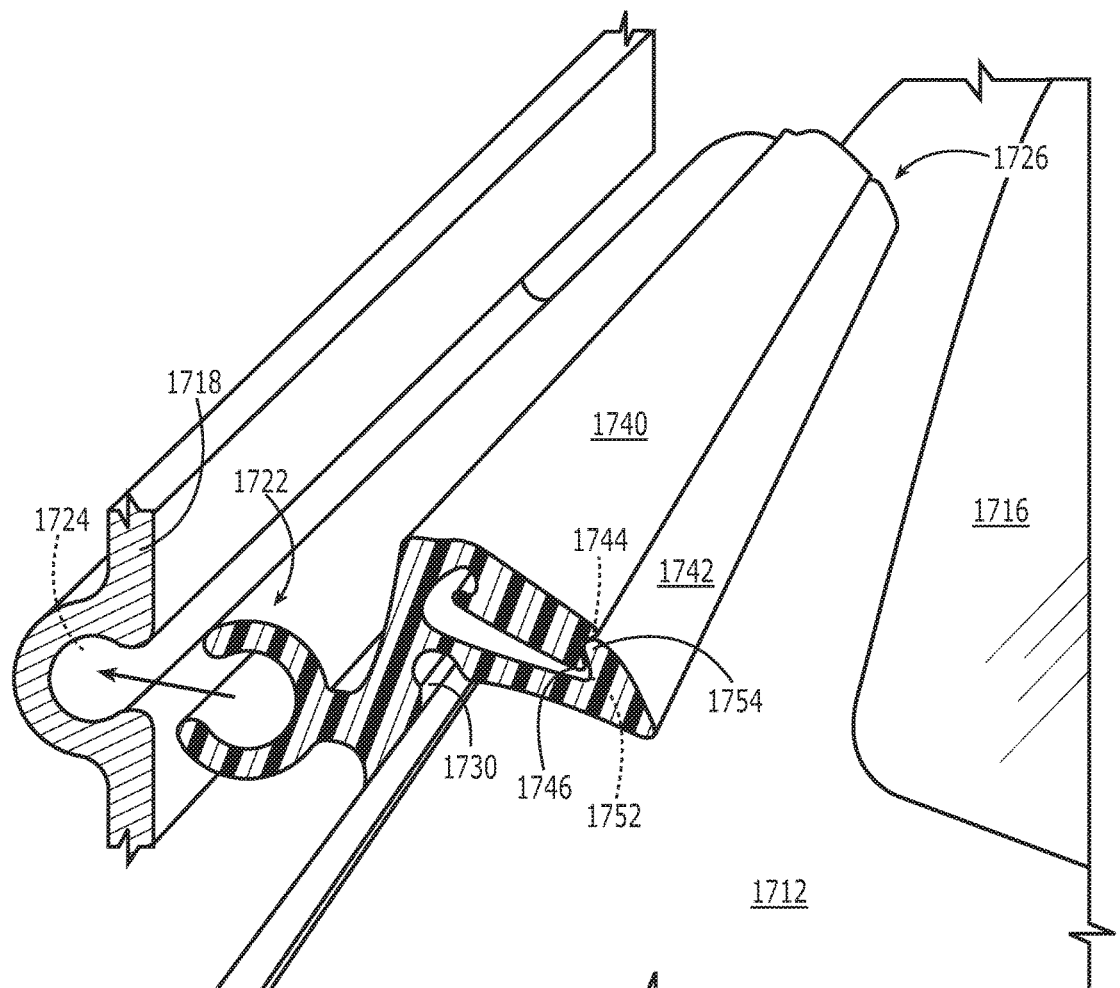
FIG. 26 is a perspective end view of the connection system as in FIG. 25, particularly showing a locked state.

FIG. 26 shows the flaps 1740, 1742 mated together with the catch 1746 seated in the notch 1752 and the catch 1754 seated in notch 1744. In this closed, second state, the locking mechanism 1726 appears substantially seamless and, under compression, holds the frame 1712 and its glass 1716 securely within a pocket 1730. Additionally, although not shown for clarity, an adhesive such as but not limited to Loctite®-brand Marine Epoxy, 3M™ Marine Adhesive Sealant, or 3M™ VHB™ tape, may be utilized in the slot 1730 to further anchor and seal the frame 1712 therein.

Figure 27:
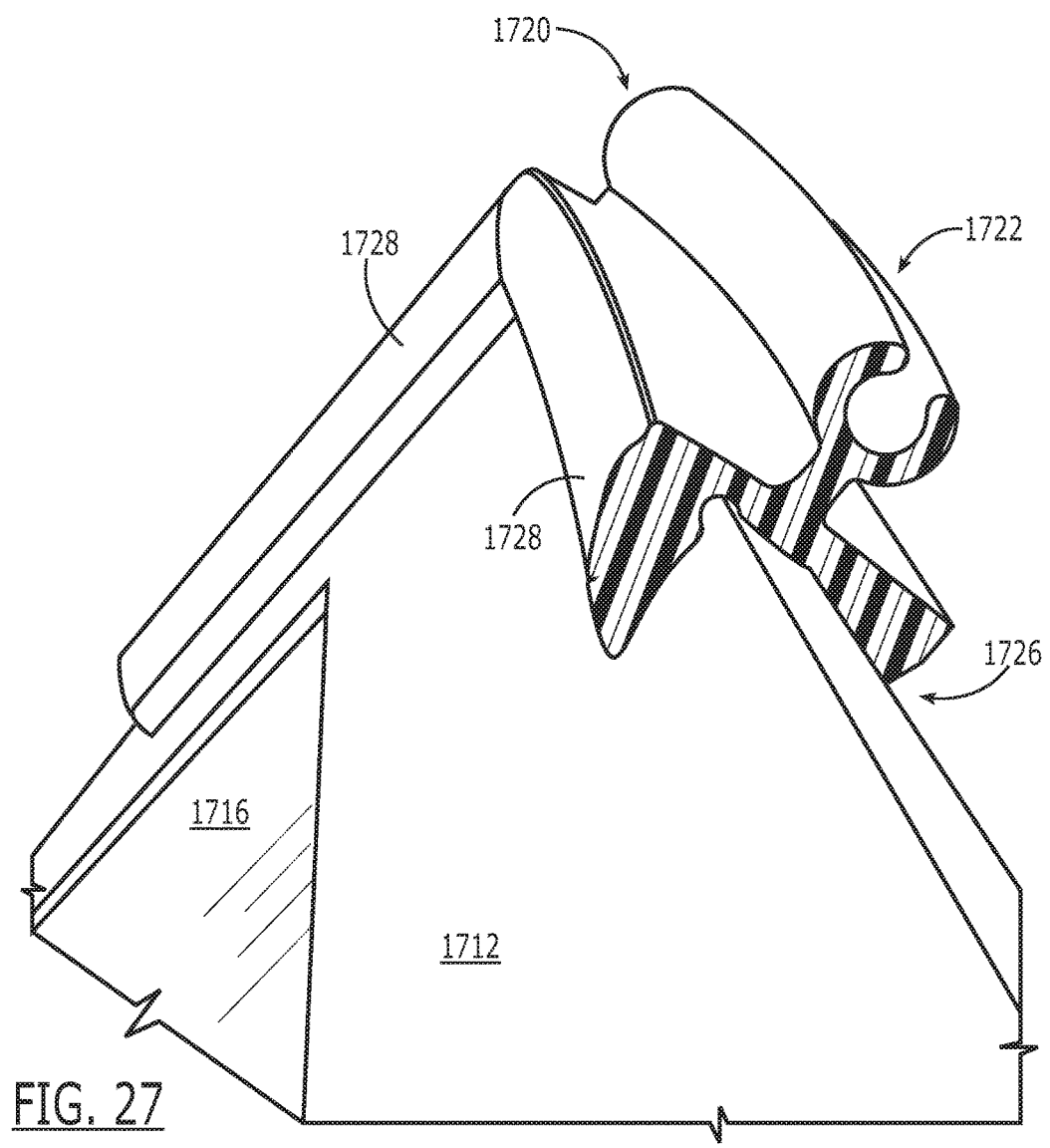
FIG. 27 is another perspective view of the connection system as in FIG. 25.
Figure 28:
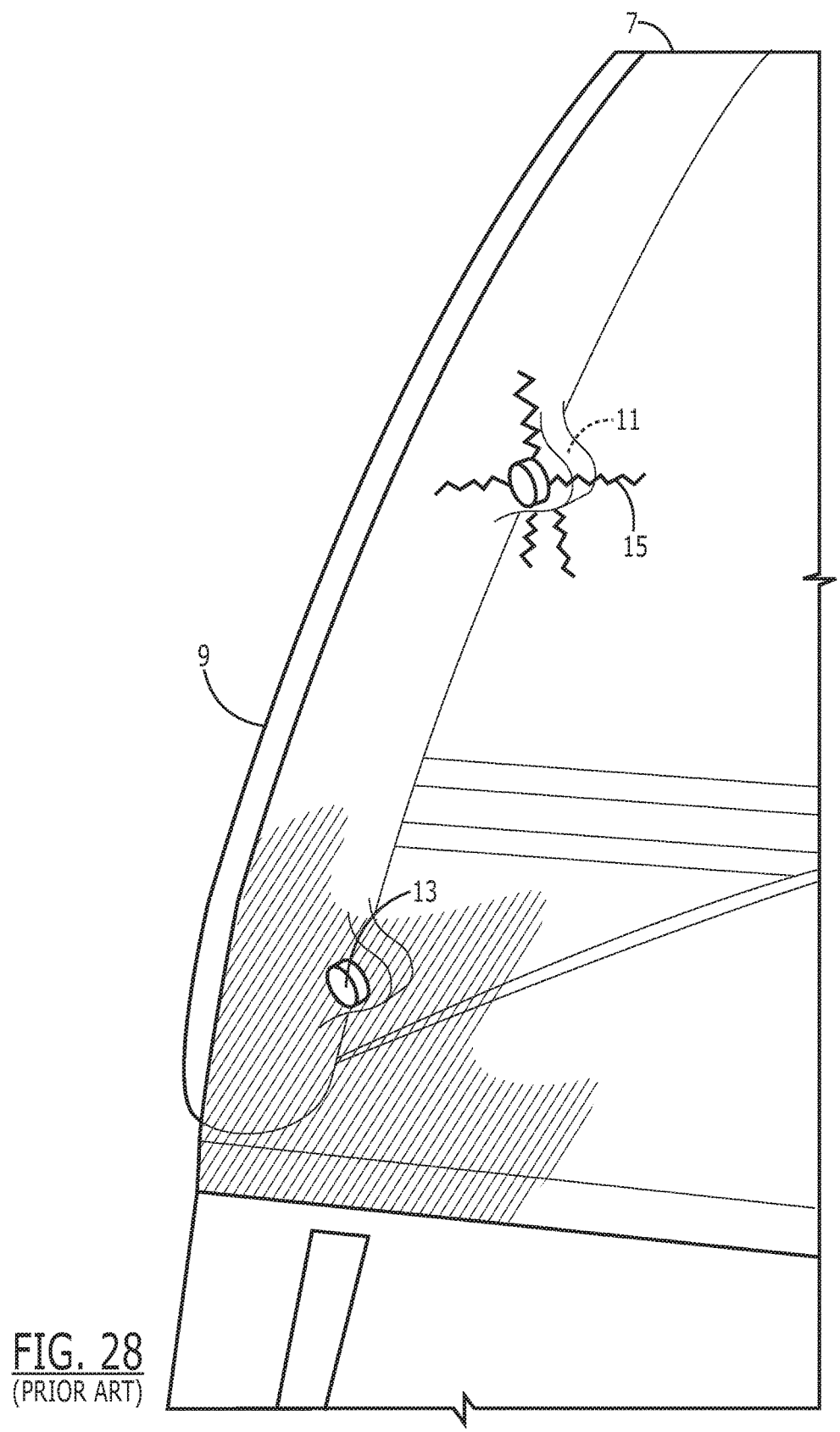
FIG. 28 shows a conventional window attachment system with bolts attached through glass.

FIG. 27 is a bottom perspective view of the glazing system 1720 as in FIG. 26. Here, a base 1728 and a portion of the locking system 1726 are holding the frame 1712 and its window 1716. Still further, a portion of another glazing system 1720 can be seen in the background along another part of the frame 1712. In this example, the glazing system 1720 is ready for further connection via the proximal end 1722.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

That which is claimed is:

1. A glazing system for attaching a window to a vehicle, the glazing system comprising:
   a first distal member and a base that form a pocket therebetween for receiving a glass structure;
   a second distal member elastically hinged to the first distal member such that, in a relaxed state, the second distal member is spaced apart from the first distal member, and in a state of tension, the second distal member is compressed against the first distal member to hold the glass structure in the pocket;
   a proximal member disposed apart from the pocket; and
   a frame having a raceway therein for receiving the proximal member, the proximal member being larger than an entryway of the raceway such that the proximal member is retained in the raceway and the glass structure is rendered stationary relative to the frame.

2. The glazing system as in claim 1, wherein the first distal member includes a first catch depending therefrom, and the second distal member includes a second catch depending therefrom, the first and second catches being configured for coupling in a state of tension.

3. The glazing system as in claim 1, wherein the proximal member is made of an elastomeric material.

4. The glazing system as in claim 1, wherein the proximal member is C-shaped or arrow-shaped in cross-section.

5. The glazing system as in claim 1, wherein the glass structure is selected from the group consisting of a plastic material, glass, a window frame and combinations thereof.

6. A system for sealing a window, the system comprising:
   a glazing system having a ledge depending therefrom and a master projection spaced apart from the ledge, the master projection defining a first proximal end and a first distal end, the first proximal end depending from a joint, the first distal end having a first attachment member, the ledge and the master projection forming a slot therebetween;
   a subservient projection having a second proximal end and a second distal end, the second proximal end depending from the joint proximate the first proximal end, the second distal end having a second attachment member; and
   an attachment projection extending in a direction away from the slot, wherein a portion of a glass structure is disposed in the slot with the attachment projection mated to a frame.

* * * * *